US008898507B1

(12) United States Patent
Crable et al.

(10) Patent No.: US 8,898,507 B1
(45) Date of Patent: Nov. 25, 2014

(54) METHODS AND APPARATUS FOR DISASTER TOLERANT CLUSTERS OF HYPERVISORS AS A VIRTUALIZED INFRASTRUCTURE SERVICE

(71) Applicants: Frederick Crable, Allen, TX (US); David A. Gillam, The Colony, TX (US)

(72) Inventors: Frederick Crable, Allen, TX (US); David A. Gillam, The Colony, TX (US)

(73) Assignee: EMC Corporation, Hopkinton, MA (US)

( * ) Notice: Subject to any disclaimer, the term of this patent is extended or adjusted under 35 U.S.C. 154(b) by 263 days.

(21) Appl. No.: 13/629,017

(22) Filed: Sep. 27, 2012

(51) Int. Cl.
G06F 11/00 (2006.01)
G06F 11/20 (2006.01)

(52) U.S. Cl.
CPC .................. *G06F 11/202* (2013.01)
USPC ........................................ 714/4.11

(58) Field of Classification Search
USPC ........................................ 714/4.11
See application file for complete search history.

(56) References Cited

U.S. PATENT DOCUMENTS

| 7,194,538 | B1 | 3/2007 | Rabe et al. | |
|---|---|---|---|---|
| 7,843,906 | B1 * | 11/2010 | Chidambaram et al. | 370/386 |
| 2006/0112247 | A1 | 5/2006 | Ramany et al. | |
| 2006/0206671 | A1 * | 9/2006 | Aiello et al. | 711/148 |
| 2009/0276771 | A1 | 11/2009 | Nickolov et al. | |
| 2011/0022812 | A1 | 1/2011 | Van Der Linden et al. | |
| 2011/0252420 | A1 | 10/2011 | Tung et al. | |
| 2013/0013285 | A1 * | 1/2013 | Cyr et al. | 703/25 |
| 2013/0055249 | A1 | 2/2013 | Vaghani et al. | |
| 2013/0124807 | A1 * | 5/2013 | Nielsen et al. | 711/162 |

OTHER PUBLICATIONS

Response to Office Action dated Aug. 15, 2013, U.S. Appl. No. 13/435,146, 17 pages.
U.S. Appl. No. 13/435,146, filed Mar. 30, 2012, Crable.
U.S. Appl. No. 14/435,317, filed Mar. 30, 2012, Prabhakara, et al.
U.S. Appl. No. 13/536,705, filed Jun. 28, 2012, Beach et al.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0. $EMC^2$, Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4,1, An Architectural Overview, White Paper, EMC Global Solutions, $EMC^2$, Feb. 2011, 24 pages.
VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.
Vblock™ Infrastructure Platforms 2010 Vblock Platforms Architecture Overview, Version 1.3, Nov. 2011, The Virtual Computing Environment Company, www.vce.com, 25 pages.

(Continued)

*Primary Examiner* — Bryce Bonzo
(74) *Attorney, Agent, or Firm* — Daly, Crowley, Mofford & Durkee, LLP

(57) ABSTRACT

Methods and apparatus for configuring disaster tolerant clusters of hypervisors as a virtualized service. In an exemplary embodiment, a system discovers WWPNs components, identifies networks zones in SANs having connectivity with at least one of the storage arrays and at least one of the journaling appliances, and creates a disaster recovery service offerings including replication in accordance with the selected service offering.

18 Claims, 30 Drawing Sheets

(56) References Cited

OTHER PUBLICATIONS

Best Practices for Deploying VMware vCloud Director on Vblock Infrastructure Platforms, Sep. 2011, The Virtual Computing Environments Company, www.vce.com, 20 pages.
Service Catalog Strategies for Vblock™ Infrastructure Platforms, IaaS COE, Jan. 2011, The Virtual Computing Environment Company, www.vce.com, 19 pages.
Unified Infrastructure Manager/Provisioning, © 2011 VCE Company, The Virtual Computing Environment Company, www.vce.com, 3 pages.
Vblock™ Infrastructure Platforms Technical Overview, © 2011 VCE Company, The Virtual Computing Environment Company, www.vce.com, 8 pages.
Vblock™ Solution for Trusted Multi-Tenancy: Technical Overview, Aug. 2011, The Virtual Computing Environment Company, www.vce.com, 75 pages.
U.S. Appl. No. 13/435,146, filed Mar. 30, 2012.
U.S. Appl. No. 13/435,317, filed Mar. 30, 2012.
U.S. Appl. No. 13/536,705, filed Jun. 28, 2012.
U.S. Appl. No. 13/536,705 Office Action dated Mar. 27, 2014, 15 pages.
Office Action dated May 1, 2014 for U.S. Appl. No. 13/435,146, filed Mar. 30, 2012.
Office Action dated May 9, 2014 for U.S. Appl. No. 13/435,317, filed Mar. 30, 2012.
Response to Office Action dated Aug. 8, 2013, U.S. Appl. No. 13/435,317, 11 pages.
U.S. Appl. No. 13/536,705 Response filed on Jul. 21, 2014 8 pages.
Office Action dated Aug. 15, 2013, U.S. Appl. No. 13/435,146, 27 pages.
Office Action dated Aug. 8, 2013, U.S. Appl. No. 13/435,317, 18 pages.

\* cited by examiner

FIG. 16

| Grade ▲ | RPO | RTO | Snapshot Policy | Granularity |
|---|---|---|---|---|
| Platinum | 1month | 2days | daily | continuous |
| Gold | 48hr | 1hr | weekly | continuous |
| Silver | 24hr | 30min | daily | continuous |
| Tin | 12hr | 30min | hourly | dynamic |

Policies - Edit Replication Policy

Edit | Delete | New

FIG. 18

| Primary Vblock | Secondary Vblock | Grade | Total Capacity | Free Capacity |
|---|---|---|---|---|
| Kansas City | Fort Worth | Platinum | 100TB | 50TB |
| Chicago | New York | Bronze | 50TB | 20TB |

Tabs: Vblocks | Blade Pool | DR Pool | Network Profile | Service Offerings | UUID Pool | MAC Pool | WWN Pool | vCenter Instances Buttons: Add | Remove | Grade ▼ | Set | Messsage

FIG. 19

Create DR Pool

Pool Name: [My Awesome DR Pool]   — 2000

Primary Vblock Pool: [Kansas City ▼] — 2002   Grade: [Gold ▼] Silver Bronze
Chicago

| Array Type | StorType | Free Capacity | RAID Level | Drive Type |
|---|---|---|---|---|
| VNX | RAID Group | 100 | RAID 1 | SATA |
| | | 100 | RAID 5+1 | SSD |
| Clariion | Thin Pool | 200 | | |

Secondary Vblock Pool: [Fort Worth ▼] — 2004
New York

| Array Type | StorType | Free Capacity | RAID Level | Drive Type |
|---|---|---|---|---|
| VNX | RAID Group | 100 | RAID 1 | SATA |
| | | 100 | RAID 5+1 | SSD |
| Clariion | Thin Pool | 200 | | |

[Save] [Cancel]

*FIG. 20*

METHODS AND APPARATUS FOR DISASTER TOLERANT CLUSTERS OF HYPERVISORS AS A VIRTUALIZED INFRASTRUCTURE SERVICE

BACKGROUND

As is known in the art, cloud computing systems contain a large number of servers and hardware devices, servers, storage systems, networking devices, software modules and components. When configuring a highly available ("HA") computer system these systems are independent and redundant to provide services regardless of single points of failure. When a computer system ("host") communicates with a storage system ("array") using network attached storage ("NAS") provided over a network ("network") the host, network, and array are single points of failure. Creating an HA service is achieved by mirroring storage volumes ("volume") to redundant arrays as the volumes are modified by the host thereby creating a copy of the volume and making it available via redundant hosts and networks.

The array contains a module or appliance having a splitter ("splitter") that splits host operations on a volume into duplicates. A splitter is utilized by replication software services ("replication") to duplicate volume operations and transport them to a redundant array. The replication reproduces the operation on a redundant volume in a redundant array.

In cloud computing, the host is insulated from the operating system software ("OS") by use of a hypervisor ("hypervisor"). The hypervisor creates a software-virtualized representation of the host hardware upon which the OS is installed and virtualized creating a virtual machine ("VM"). Hypervisors on many hosts can communicate across networks regarding VM and host health. In addition, hypervisors can use these networks in conjunction with the replicated volume to manage multiple copies of the VM using redundant hosts. The combination of replication and virtual machines provide an enhanced service where virtual machines will be protected against failures in the infrastructure.

Sets of hosts, switches, and arrays are assembled in close proximity to make up a unit of cloud infrastructure ("infrastructure") sometimes referred to as a pod ("pod") of devices. The pod components are physically connected via Ethernet networks, for example. The logical configuration of pods components and network creates a platform that is sold or leased as a service ("service") from a menu of predefined configuration offerings ("offering") for consumers of cloud computing. Offerings from vendors name the type and quantity of resources such as 3 highly available servers with 16 GB of memory having 4 processors with 20 GB of disk space each and a shared storage volume of 200 GB. This allows for the consumer to use the host and storage resources in predetermined offerings within the pods making up the cloud.

SUMMARY

The present invention provides automated configuration for disaster tolerant clusters of hypervisors as a virtualized infrastructure service. Using an information model (IM) including hosts, arrays, network devices, and replication and service offerings in the cloud-computing environment, steps to configure array and replication system can be computed to create a storage service from a storage service offering. Provisioning can execute changes to logical configurations of array and replication services comprised of hosts, networks, replication nodes, and array resources. Provisioning identifies a set of hosts and adaptors along with the replication configurations and array configurations required to provide hosts with high availability as it relates to geographic disasters and/or single component failures.

Exemplary embodiments of the invention allow for provisioning and configuration of sets of logical services staged at geographic locations utilizing replication and hypervisors, and for automated staging of hosts for use as redundant services and identifies available locations where volumes may be replicated to provide HA or disaster recovery (DR) services.

In one embodiment, using an information model of splitter and POD locations in conjunction with a grading and classification system for physical resources, the system can identify and create logical resources required to satisfy a set of constraints for logical configuration, replication and other resource selections. Resources can then be provisioned into infrastructure services based on Class of Service using a service offering definition into sets of pod infrastructures. Selecting and activating a predefined disaster recovery ("DR") service offering initiates the automation of the disaster tolerant virtualized infrastructure service.

In one aspect of the invention, a method comprises discovering, using a processor, WWPNs for storage arrays in a system by reading an interface of the storage arrays, discovering WWPNs of ports of the discovered storage arrays, discovering WWPNs of journaling appliances, discovering WWPNs of splitters seen by the journaling appliances, discovering paths for the splitters, discovering network adaptor addresses for the paths, identifying networks zones in SANs having connectivity with at least one of the storage arrays and at least one of the journaling appliances, determining ones of the storage arrays logged in and zoned in the SANs, determining WWPNs of the storage arrays logged in and zoned in the SANs, determining WWPN zoning of the storage arrays, identify adaptors for storage arrays zoned and logged in, determining ones of the storage arrays and ones of the journaling appliances zoned together for correlating replication networks host, determining ones of the storage arrays seen the journaling appliances for correlating ones of the splitters, identifying disaster recovery pools, creating a disaster recovery policy, creating disaster recovery service offerings, the service offerings including geographically separated primary and secondary storage, receiving a user selection of a disaster recovering service offering, assigning hosts to the selected service offering, creating a hypervisor at primary and secondary infrastructure for the selected service offering, creating a volume at the primary and secondary infrastructure for the selected service offering, mapping and masking volumes to the journaling appliance and the hypervisor for the selected service offering, and enabling replication in accordance with the selected service offering.

The method can further include one or more of the following features: applying disaster recovery policy settings to the service, determining an ability to connect volumes from a first pod to a second pod, discovering configuration information for the splitters including adaptor ports of a storage array on which a first one of the splitters is running, using the splitter configuration information to associate replication networks to the storage arrays and to build disaster recovery pools, determining a list of paths for the splitters and a list of network adapter addresses for the paths, correlating the storage arrays to replication networks via a storage area network, correlating the journaling appliances via the storage area networks, and/or deleting the selected service.

In another aspect of the invention, an article comprises: a computer readable medium containing stored non-transitory instructions that enable a machined to perform: discovering, WWPNs for storage arrays in a system by reading an interface of the storage arrays, discovering WWPNs of ports of the discovered storage arrays, discovering WWPNs of journaling appliances, discovering WWPNs of splitters seen by the journaling appliances, discovering paths for the splitters, discovering network adaptor addresses for the paths, identifying networks zones in SANs having connectivity with at least one of the storage arrays and at least one of the journaling appliances, determining ones of the storage arrays logged in and zoned in the SANs, determining WWPNs of the storage arrays logged in and zoned in the SANs, determining WWPN zoning of the storage arrays, identify adaptors for storage arrays zoned and logged in, determining ones of the storage arrays and ones of the journaling appliances zoned together for correlating replication networks host, determining ones of the storage arrays seen the journaling appliances for correlating ones of the splitters, identifying disaster recovery pools, creating a disaster recovery policy, creating disaster recovery service offerings, the service offerings including geographically separated primary and secondary storage, receiving a user selection of a disaster recovering service offering, assigning hosts to the selected service offering, creating a hypervisor at primary and secondary infrastructure for the selected service offering, creating a volume at the primary and secondary infrastructure for the selected service offering, mapping and masking volumes to the journaling appliance and the hypervisor for the selected service offering, and enabling replication in accordance with the selected service offering.

The article can further include instructions for enabling one or more of the following features: applying disaster recovery policy settings to the service, determining an ability to connect volumes from a first pod to a second pod, discovering configuration information for the splitters including adaptor ports of a storage array on which a first one of the splitters is running, using the splitter configuration information to associate replication networks to the storage arrays and to build disaster recovery pools, determining a list of paths for the splitters and a list of network adapter addresses for the paths, correlating the storage arrays to replication networks via a storage area network, correlating the journaling appliances via the storage area networks, and/or deleting the selected service.

In a further aspect of the invention, a system comprises: at least one processor, memory coupled to the at least one processor, the memory and the at least one processor configured to enable: discovering WWPNs for storage arrays in a system by reading an interface of the storage arrays, discovering WWPNs of ports of the discovered storage arrays, discovering WWPNs of journaling appliances, discovering WWPNs of splitters seen by the journaling appliances, discovering paths for the splitters, discovering network adaptor addresses for the paths, identifying networks zones in SANs having connectivity with at least one of the storage arrays and at least one of the journaling appliances, determining ones of the storage arrays logged in and zoned in the SANs, determining WWPNs of the storage arrays logged in and zoned in the SANs, determining WWPN zoning of the storage arrays, identify adaptors for storage arrays zoned and logged in, determining ones of the storage arrays and ones of the journaling appliances zoned together for correlating replication networks host, determining ones of the storage arrays seen the journaling appliances for correlating ones of the splitters, identifying disaster recovery pools, creating a disaster recovery policy, creating disaster recovery service offerings, the service offerings including geographically separated primary and secondary storage, receiving a user selection of a disaster recovering service offering, assigning hosts to the selected service offering, creating a hypervisor at primary and secondary infrastructure for the selected service offering, creating a volume at the primary and secondary infrastructure for the selected service offering, mapping and masking volumes to the journaling appliance and the hypervisor for the selected service offering, and enabling replication in accordance with the selected service offering.

BRIEF DESCRIPTION OF THE DRAWINGS

The foregoing features of this invention, as well as the invention itself, may be more fully understood from the following description of the drawings in which:

FIG. 16 is an exemplary user interface in the form of a display screen containing the registration information used to identify the hypervisor management interface;

FIG. 18 is an exemplary user interface in form of a display screen showing replication policy;

FIG. 19 is an exemplary user interface in form of a display screen showing DR pools;

FIG. 20 is a is an exemplary user interface in form of a display screen showing DR information;

DETAILED DESCRIPTION

Figure 1:
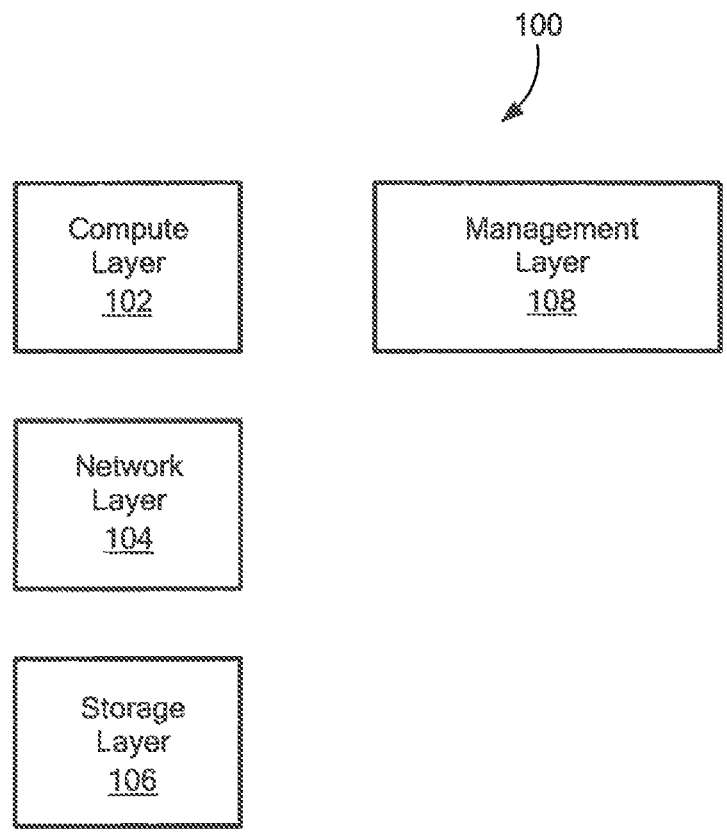
FIG. 1 is a high level schematic representation of a cloud storage system having service offering with disaster recovery in accordance with exemplary embodiments of the invention.

FIG. 1 shows an exemplary cloud storage environment 100 having a compute layer 102, a network layer 104, a storage layer 106, and a management layer 108 having automated configuration for disaster tolerant clusters of hypervisors as a virtualized infrastructure service in accordance with exemplary embodiments of the invention. The environment may be referred to as a platform. It is understood that any practical number of platforms can be combined into a cloud storage environment.

The compute layer 102 comprises components, such as blade servers, chassis and network interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
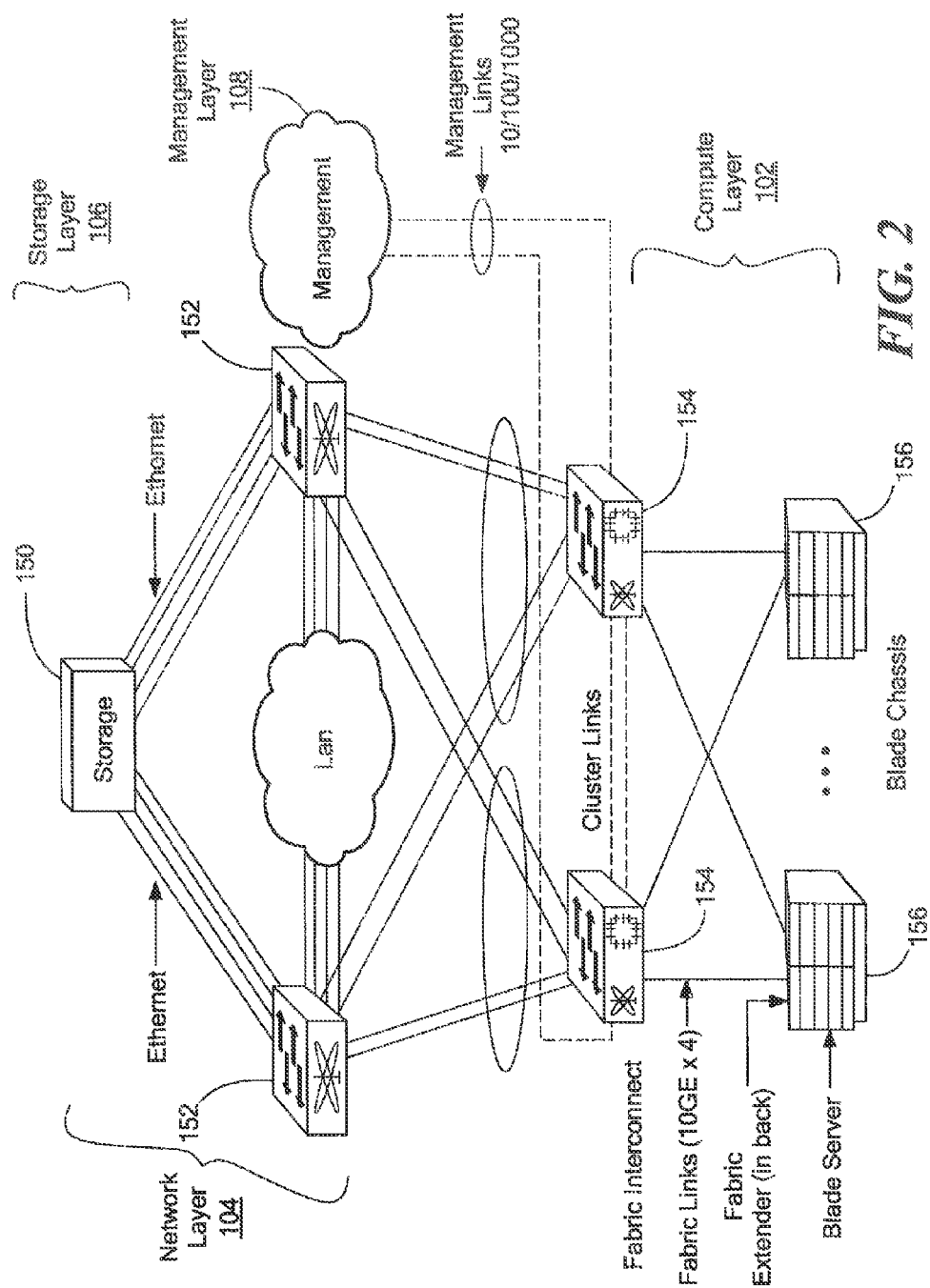
FIG. 2 is a schematic representation showing further detail of the cloud storage system of FIG. 1.

FIG. 2 shows further detail for the environment 100 if FIG. 1. The storage layer 106 can include storage components 150, such as CLARIION storage components from EMC Corporation of Hopkinton Mass. The network layer 104 can include a pair switches 152, such as Nexus 5000 Series Ethernet Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
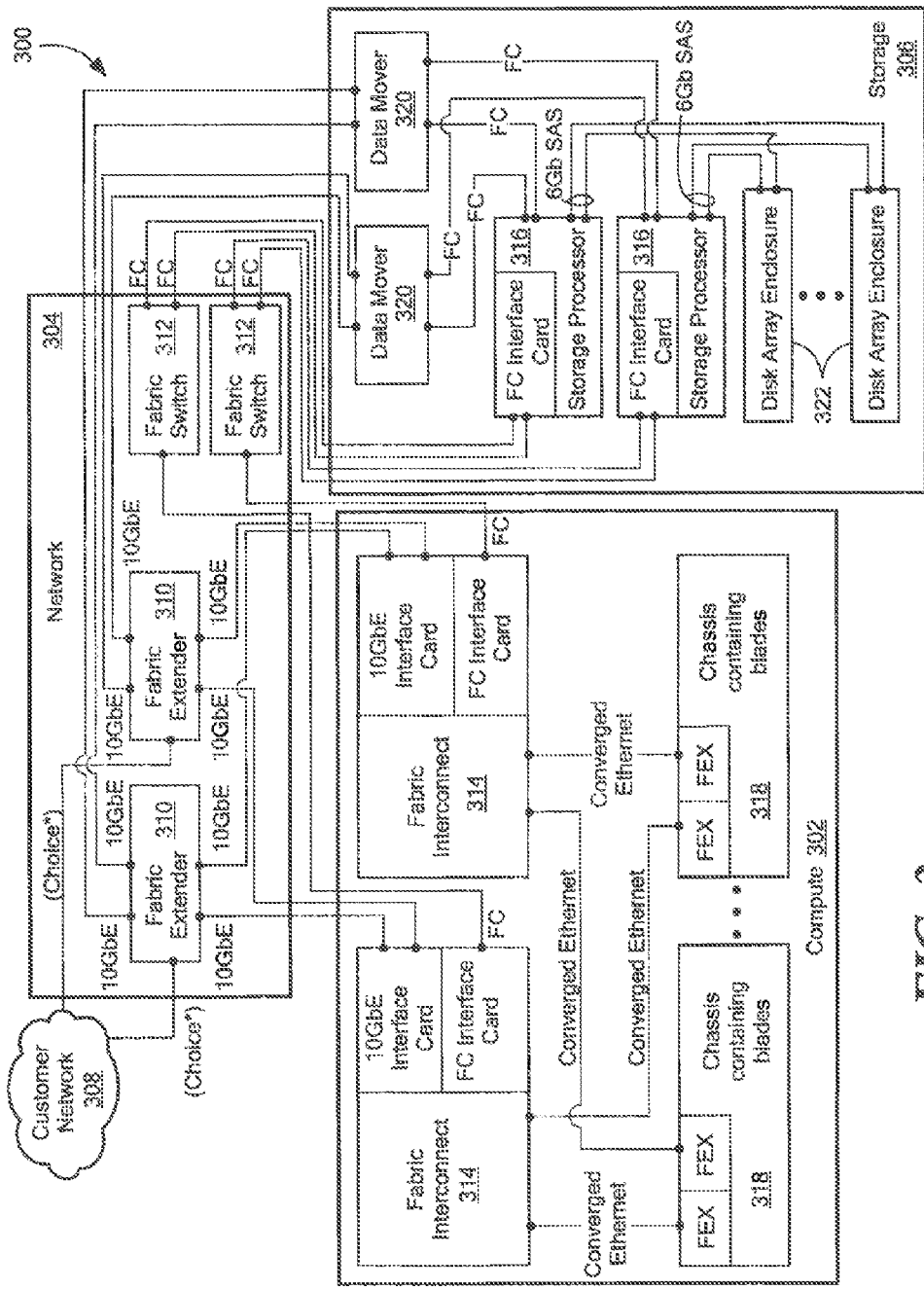
FIG. 3 is a schematic representation showing further detail of the cloud storage system if FIG. 2.
Figure 4:
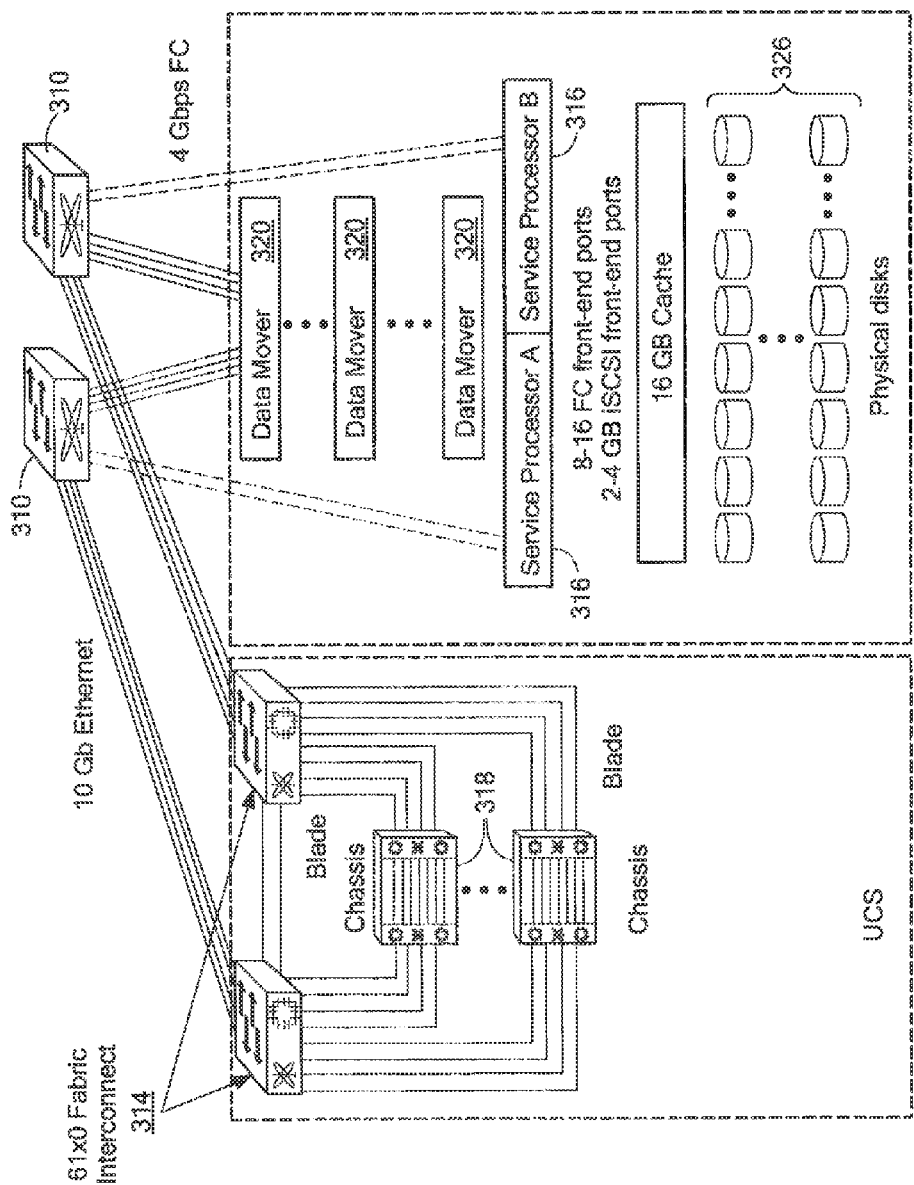
FIG. 4 is a schematic representation showing further detail of a storage layer of the cloud storage system of FIG. 3.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports and 2 to 4 Data Mover compute notes containing Ethernet adaptors.

It is understood that a variety of other configurations having different interconnections and storage configuration can be provided to meet the needs of a particular application.

The management layer can include a number of applications to perform various functions for overall control, configuration, etc., of the various platform components. For example, management applications can include a visualization function, such as vSphere/vCenter, by VMware of Palto Alto, Calif. A further management application can be provided as part of the Unified Computing System (UCS) by Cisco. It is understood that the blade chassis and fabric interconnection can be considered part of the UCS. Another management application can includes a management interface, such as EMC Unisphere, to provide a flexible, integrated experience for managing existing storage systems, such as CLARIION and CELERRA storage devices from EMC. A further management application includes a platform element manager, such as unified infrastructure manager (UIM) by EMC, for managing the configuration, provisioning, and compliance of the platform.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed to mean a generic product, function, or module, absent a clear indication to the contrary.

Figure 5:
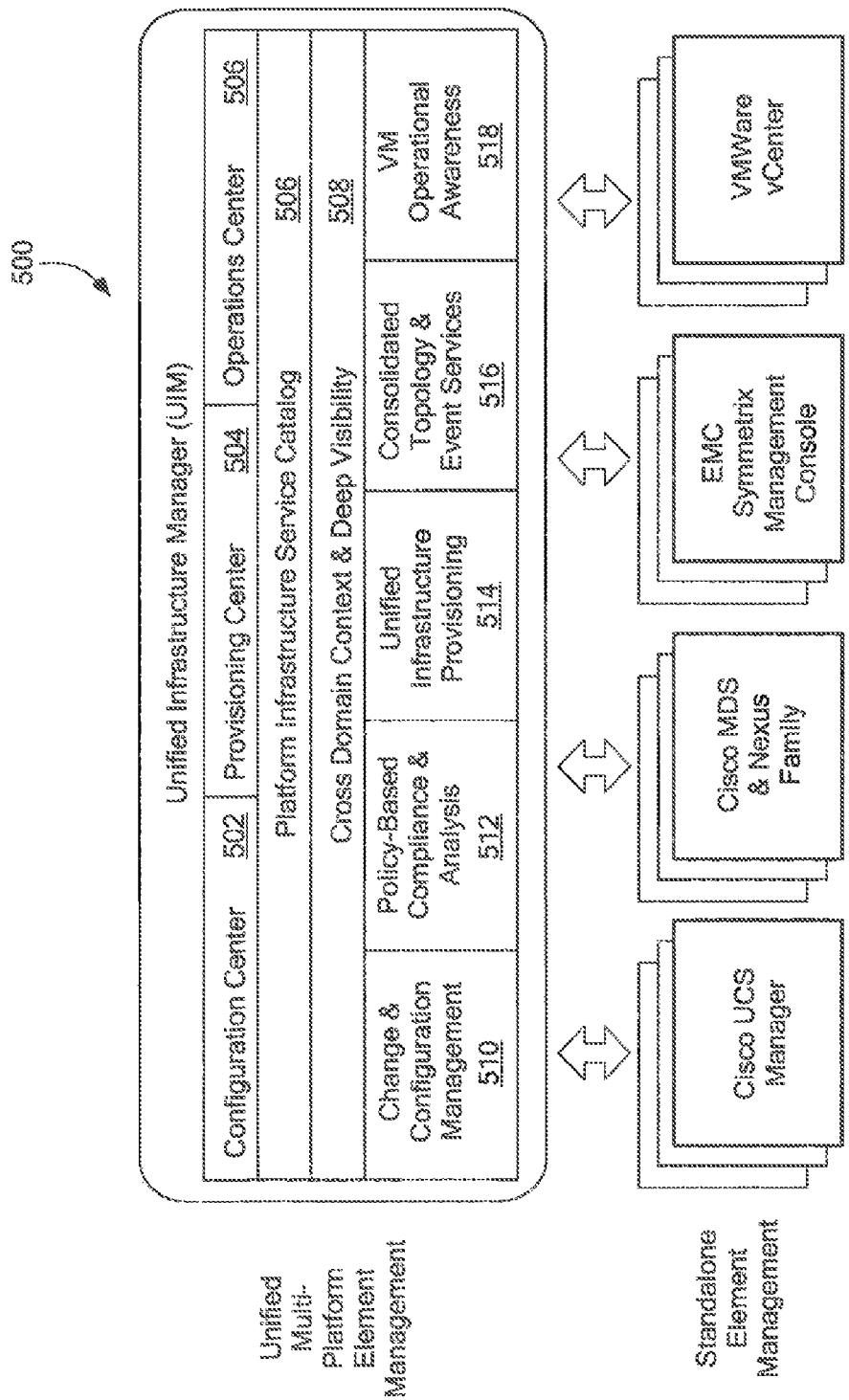
FIG. 5 is a schematic representation of a unified infrastructure manager (UIM) module.

FIG. 5 shows an exemplary unified infrastructure manager 500 having provisioning in accordance with exemplary embodiments of the invention. In an exemplary embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications. The unified infrastructure manager 500 performs platform deployment by abstracting the overall provisioning aspect of the platform(s) and offering granular access to platform components for trouble shooting and fault management.

Figure 6:
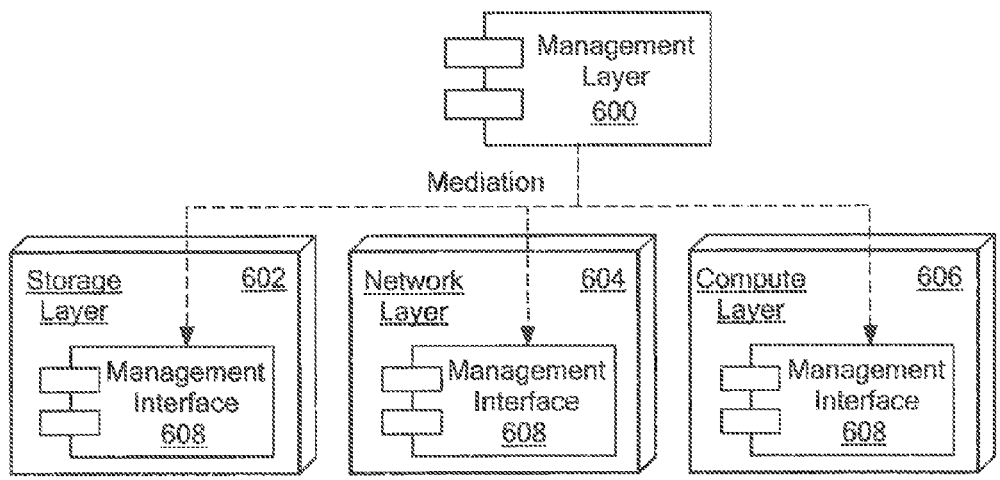
FIG. 6 is a schematic representation of layers having a management interface.

FIG. 6 shows a management/service layer 600 connected to a storage layer 602, a network layer 604, and a compute layer 606, each having a respective management interface layer 609. In general, the management layer 600 uses device native interfaces provided by the equipment vendor to translate desired configuration settings into actual configuration settings. The native interface is directly related to the equipment vendor. In one embodiment, the service management layer 600 uses native command line interfaces (CLI) provided by software components the equipment manufacturer supplies or using application programming interfaces (APIs) to send commands to the management interface using messaging protocols. The API defines a programming language binding for executing configuration instructions. In both cases the equipment manufacturer supplies computer software that drives the management interface. In the case of the CLI, the commands are either executed on the operating system hosting the management layer and communicating to the device over proprietary protocols or run on the operating system hosting the device management interface. CLIs typically take properties sets and return results in textual or encoded formats such as XML.
Example:
naviseccli -h 192.168.101.40 bind r5 0 -rg0 -cap20 -rc 1 -sp a -sq gg -wc 1

APIs provide a native computer programming language binding that can be executed from the native computer programming language. Java is a widely used language in computer programming and many vendors provide java language libraries and examples to execute commands against the management interface of their devices.

Figure 7:
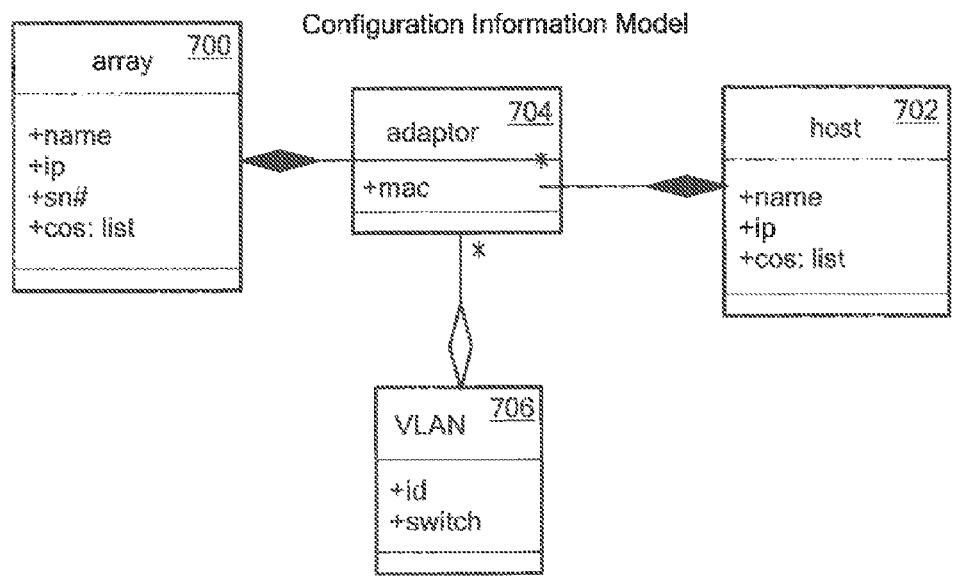
FIG. 7 is a representation of a configuration information model.

FIG. 7 shows a model of the physical information stored within the management layer of the components in FIG. 1. An array model component 700 contains properties that describe the pod and management information for the array. A host model component 702 contains properties that describe the pod and management information for the host. Instances of an adaptor model component 704 are associated with arrays and hosts to indicate the array or host has an Ethernet adaptor. Hosts and arrays may have many adaptors. Adaptors 704 may have additional detailed properties that indicate the identifier for the adaptor and network profiles indicating the IP addresses and MAC addresses of the adaptor. Instances of VLAN model components 706 are loosely associated with the adaptors representing the logical network connectivity between the adaptor and the other adaptors associated to that VLAN.

Figure 8:
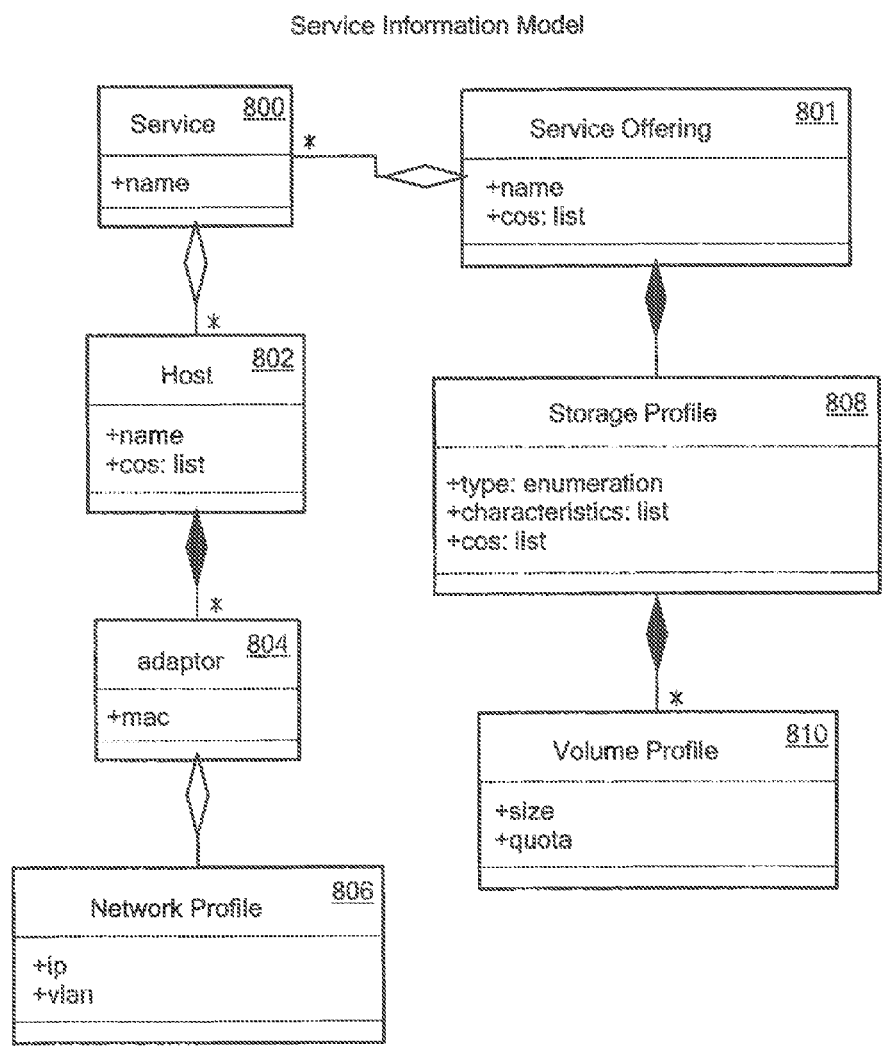
FIG. 8 is representation showing a service configuration model.
Figure 8A:
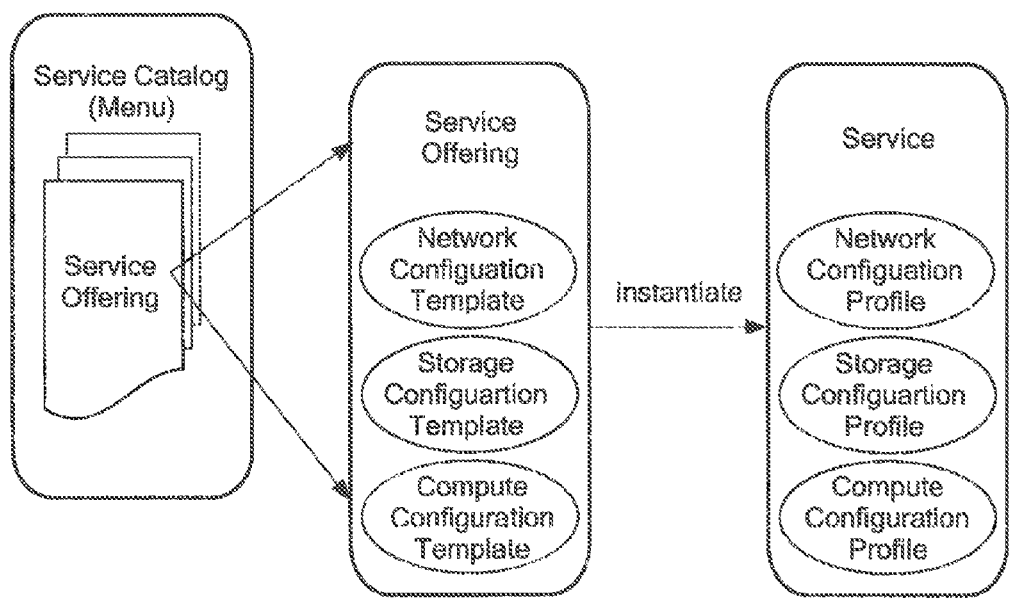
FIG. 8A is representation of a service catalog menu and service offerings.

FIG. 8 shows a model of the service and offering information stored within the management layer of the components in FIG. 7. A service 800 is a representation of a desired service as described by a service offering 801. An exemplary relationship is shown in FIG. 8A where the service properties as described in the offering are used to describe the characteristics and properties of the service to be created. A service catalog has a menu of service offerings, each having network configuration settings, service configuration settings, and compute configuration settings.

Referring again to FIG. 8, one or more hosts 802 are associated with a service to fulfill the compute requirements of the service. One or more network adaptors 804 are associated with a service to indicate the need for Ethernet connectivity to a network. A network profile 806 is associated with each adaptor 804 that indicates the VLAN and IP address required to fulfill the storage connectivity using the Ethernet. This network profile 806 is associated to a storage profile 808 to indicate that the host is to obtain storage from a network with this VLAN and IP network.

The service offering 801 is used to hold the relationships and detailed description for the user to choose the offering from a menu of offerings. The storage profile 808 is associated with the offering 801 to indicate the class of storage and service settings for the storage to be configured such as features like de-duplication, write once read many, auto-extension, maximum auto-extensions, thin provisioning, etc. A volume profile 810 is associated with the storage profile 808 to indicate specific volume properties and characteristics such as size and quota limitations.

Figure 9:
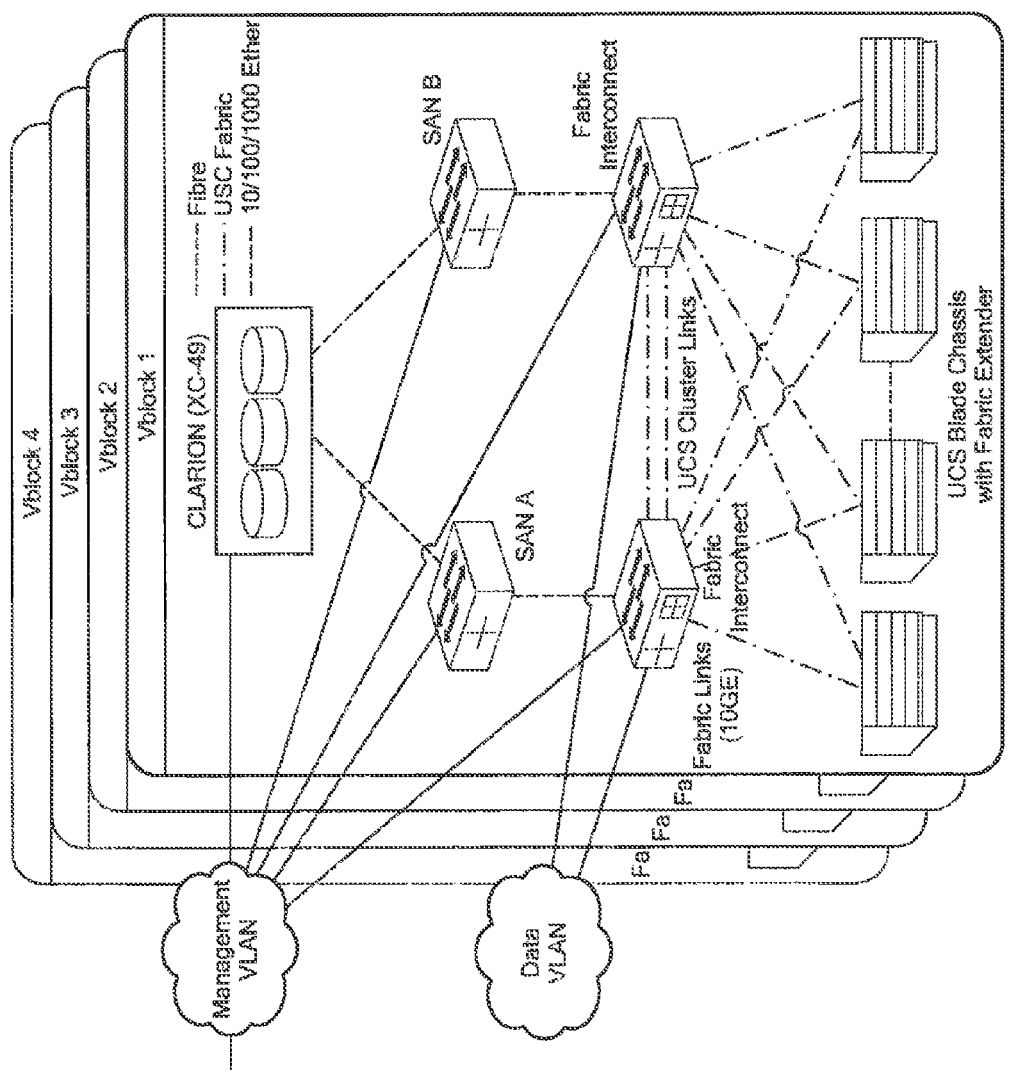
FIG. 9 is a schematic representation showing pods in a cloud environment.
Figure 10:
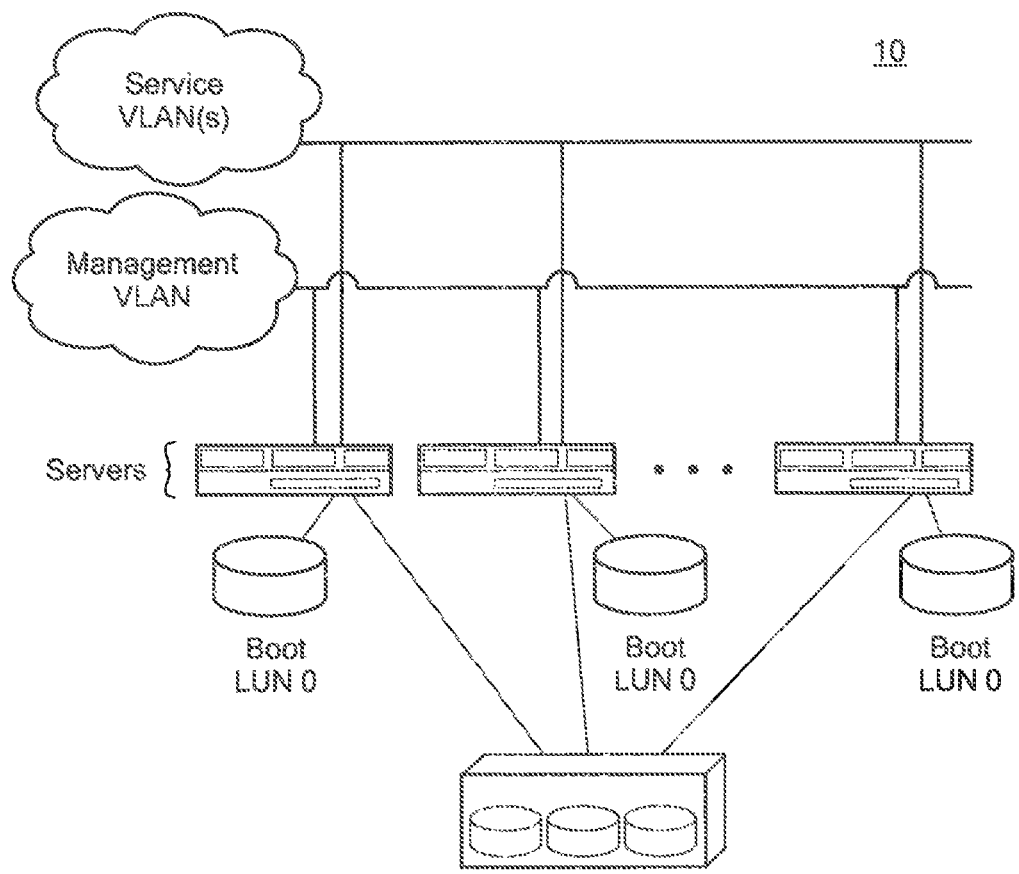
FIG. 10 is a schematic representation of servers coupled to shared storage.

FIG. 9 shows a series of "PODs" used to create cloud infrastructures, where each Vblock is considered its own POD. FIG. 10 shows a set of servers in a POD arranged in a cluster with shared storage.

Figure 11:
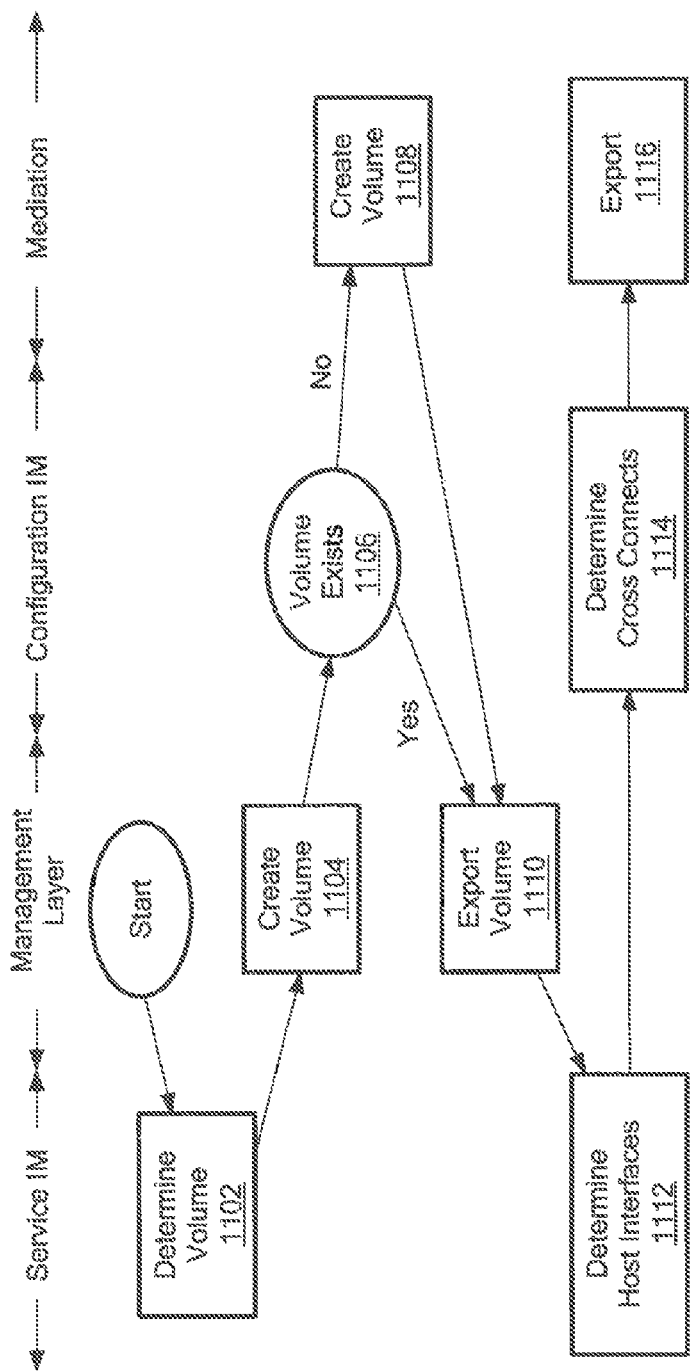
FIG. 11 is a flow diagram showing an exemplary sequence of steps for provisioning shared NFS storage.

FIG. 11 shows an exemplary sequence of steps for associating a NFS shared volume to a host. Initially, a user of the management layer selects an offering and chooses to have it implemented. The information presented to make this choice is described in the service information model and presented as a menu option for selection. The offerings can be defined statically and predetermined before accepting the menu selection. Optionally an administrator of the POD infrastructure can define a canned set of offerings to augment and extend the predefined offerings of the management layer.

In step 1102, based on the offering chosen by the user, a pod can be selected by the management layer using the service information model that defines the desired quality of service and class of service required. This information is described in the service information model storage profile and volume profile (see FIGS. 8 and 8A). Using this information the system can determine the correct pod placement for the volume.

Figure 11A:
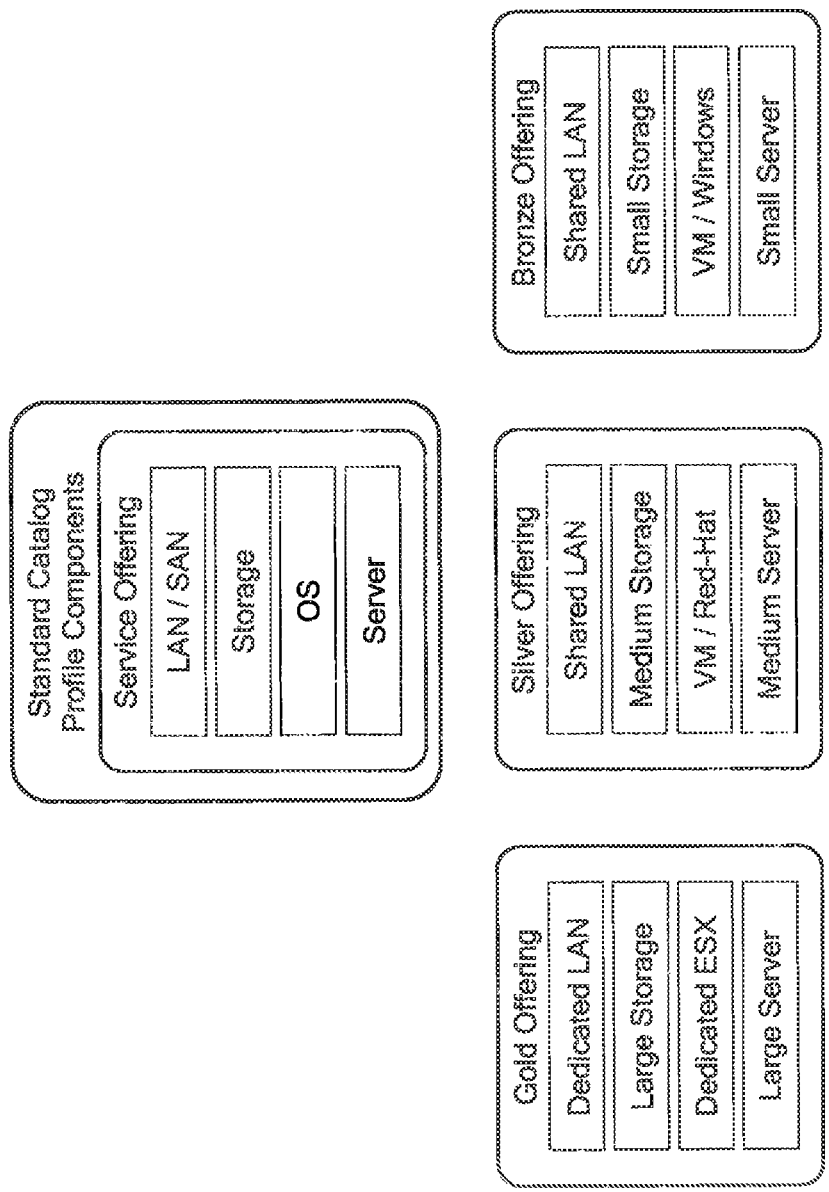
FIG. 11A is a pictorial representation of various service offerings.

A POD is chosen by matching the class of service defined in the offering with the class of service provided by the POD. The Class of Service (CoS) is defined as a label that is relative to the service provided by the POD. For example, as shown in FIG. 11A, a Gold class of service could be defined as having a dedicated LAN, large storage, dedicated ESX and a large server. Silver and Bronze offerings provide less in at least one area. In embodiment, the Gold class of service provides de-duplication. When selecting a POD for service placement the management layer selects an array that provides the de-duplication feature for Gold services. The list of CoS for an array would be cross referenced with the list of CoS for a service offering to locate an acceptable pod and array on which to create the service.

In step 1104, once the volume characteristics and properties are known from the service information model, the service layer can begin to create the volume by defining the configuration settings such as size, protection levels, and placement of the volume on a data mover in relationship to the VLANs connecting the host and array adaptors from the configuration model. The properties of the volume are used in conjunction with the CoS of the Storage Profile to create the configuration settings of the volumes in the service. The Service's network profile determines the VLAN upon which to establish the network connection to the network shared volume. In step 1106, it is determined whether the volume exists, such as by using the management interface of the array the service layer to query the array(s) of the pod to see if there were already volumes created for that service If it is determined the service docs not already contain a volume that meets the criteria of the offering, the management layer executes commands through a mediation interface to the physical device management system to create the volume using the characteristics determined above in step 1108.

Processing continues in step 1110 wherein the volume is exported. Using the network profile information contained in the service information model, the service layer determines the network access restrictions consisting of the VLAN, IP address, and authentication credentials for the network-attached volume.

In step 1112, a host interface is determined using the service information model network profile and the VLAN and IP address settings are determined for the host adaptor. In step 1114, the management layer determines cross-connects. Using the VLAN the correct adaptor for the array can be determined by cross-referencing the membership of the adaptor in a given VLAN. In step 1116, using the information determined above, the array management interface is configured to expose the created volume using NFS protocol to the determined IP address.

Figure 12:
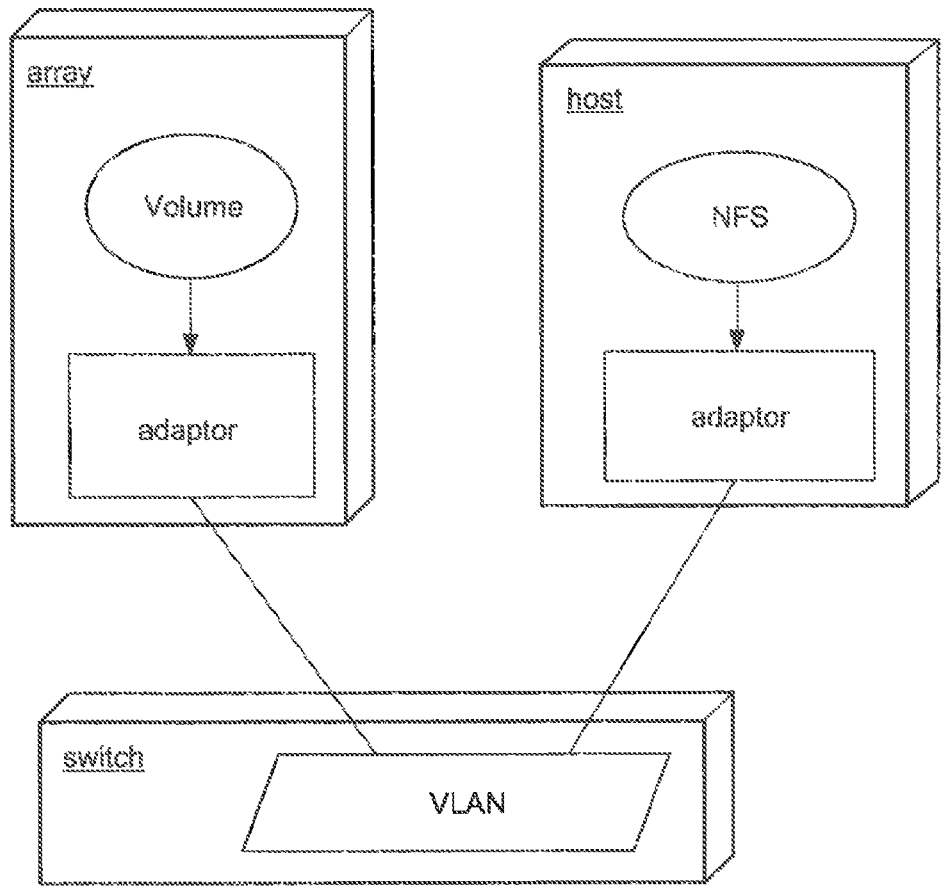
FIG. 12 is a schematic representation of a VLAN coupled to an array and host in a cloud environment.

FIG. 12 is a logical schematic for the service to be created as the result of the flow of FIG. 11. An array is told via mediation to create a volume and export it to a given IP address. A volume is created using the service offering storage and volume profiles. A array adaptor exports the volume to the IP address and implements the access control defined in the service network profile. A switch/VLAN is utilized to carry NFS over IP traffic from the adaptor of the array to the adaptor of the host. The host uses its operating system network file system sub-system to make the array volume visible to the guest of the host. The NFS uses the adaptor interface to access the IP network and access the volume exposed over the switch's VLAN.

Figure 13:
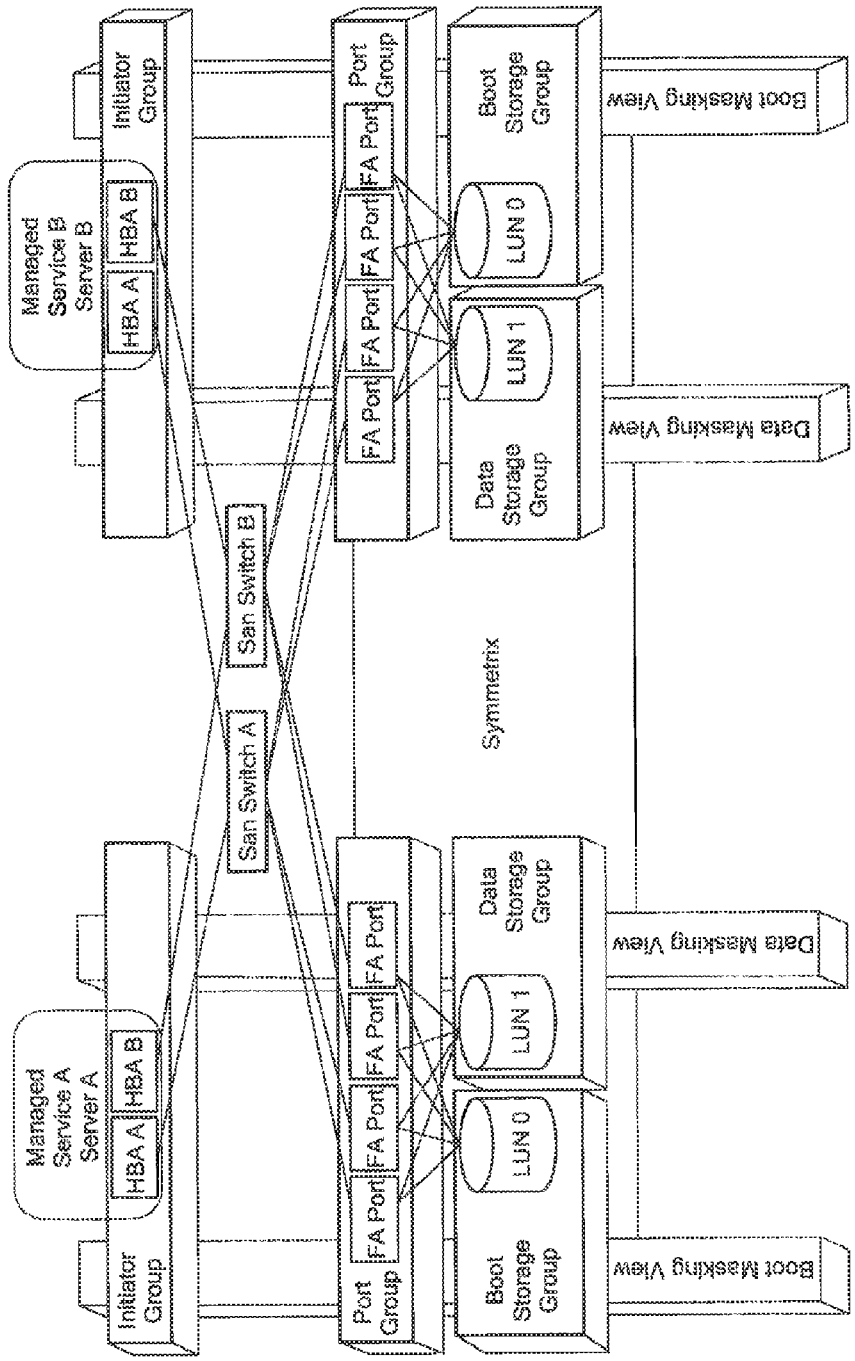
FIG. 13 is a model of physical information stored within the management layer of components in FIG. 9 for a single POD.

FIG. 13 shows an exemplary model of physical information stored within the management layer of the components in FIG. 9 for a single POD. It is understood that Managed Service corresponds to a host, HBA refers to a Host bus adaptor (network interface) from host to SAN, FA Port refers to an Array network interface from array to SAN, SAN Switch refers to a storage network, Symmetric refers to a SYMMETRXI array from EMC Corporation, a LUN refers to a volume, and Masking view, Port Group, and Initiator Group refer to the array configuration.

Figure 14:
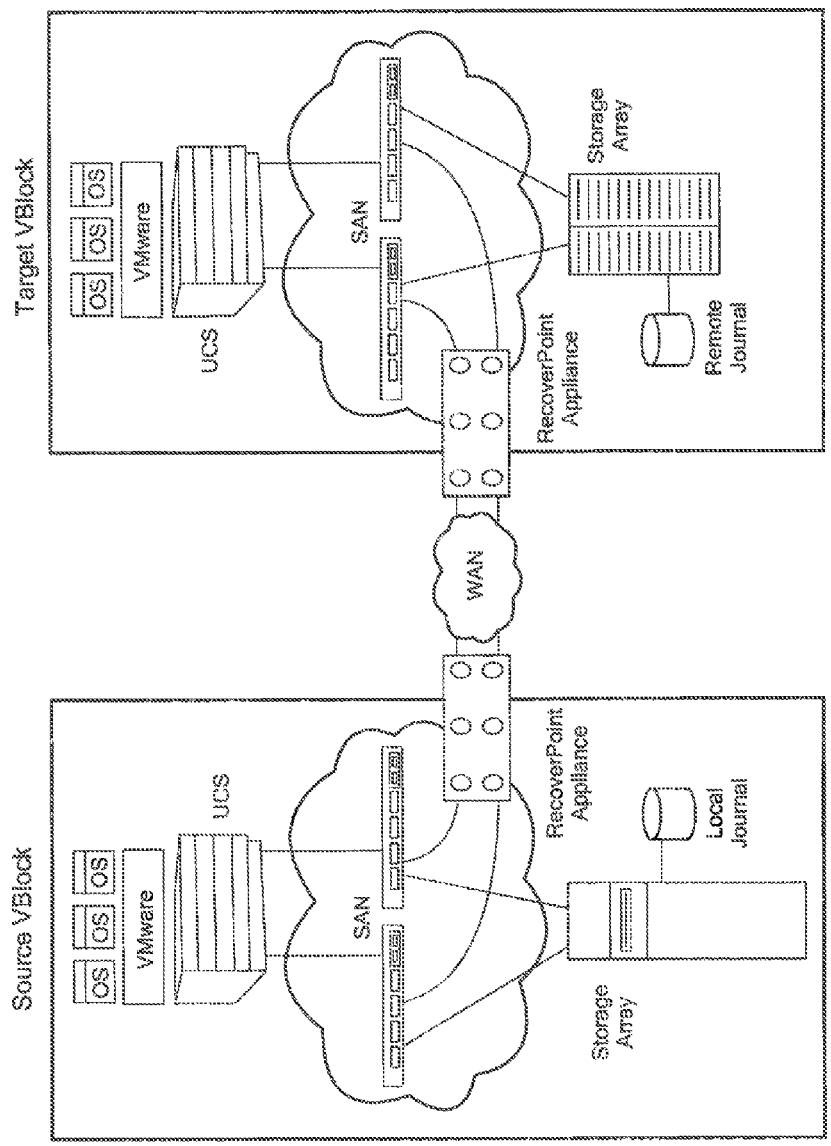
FIG. 14 is a schematic representation of an exemplary disaster recovery (DR) configured cloud infrastructure with replication journaling.

FIG. 14 shows an exemplary disaster recovery (DR) configured cloud infrastructure. The source and target (primary and secondary) PODs (Vblocks) of hypervisors (VMware) are replicated using RECOVER POINT replication journaling software from EMC Corporation, over a wide-area network (WAN). It is understood that vendor specific information is used to facilitate an understanding of exemplary embodiments of the invention and should not limit the invention in any way. Any specific vendor information should be construed to mean a generic product, function, or module, absent a clear indication to the contrary.

Exemplary disaster recovery journaling systems are shown and described in exemplary U.S. Pat. Nos. 8,214,612, 8,060, 714, and 7,774,565, all of which are incorporated herein by reference. In production mode, a journaling appliance is configured to act as a source side protection agent for a host device. The appliance replicates SCSI I/O requests where a replicated SCSI I/O request is sent to the other appliance. After receiving an acknowledgement from the other appliance, the appliance sends the SCSI I/O request to the logical unit. A splitter is provided as part of the journaling system to 'split' write requests.

Figure 15:
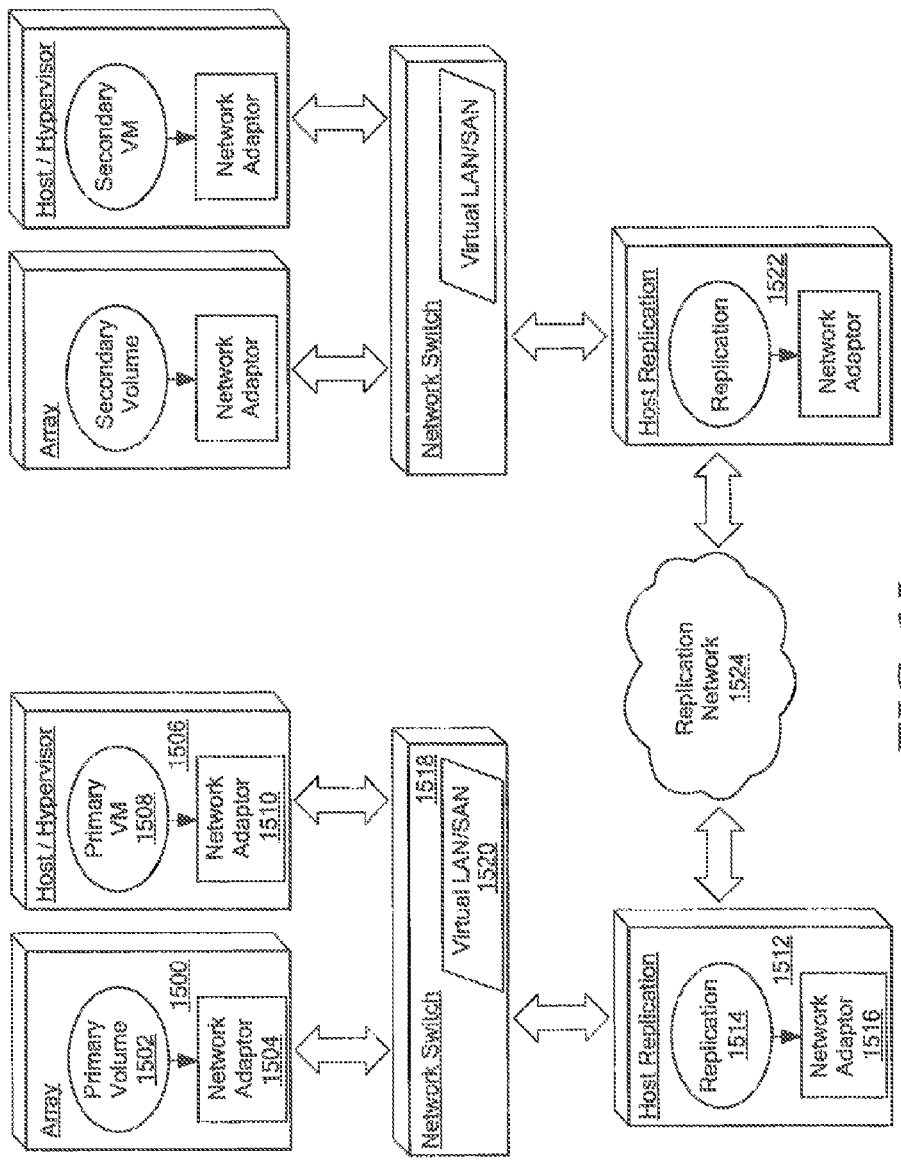
FIG. 15 is a logical schematic for a service to be created having disaster tolerant clusters of hypervisors as a virtualized infrastructure service

FIG. 15 is a logical schematic for a service to be created, such as disaster tolerant clusters of hypervisors as a virtualized infrastructure service, in accordance with exemplary embodiments of the invention. An array 1500 includes a primary volume 1502 and a network adaptor 1504. A host/hypervisor 1506 comprises a primary virtual machine 1508 and a network adaptor 1510. A host replication 1512 includes a replication module 1514 and a network adapter 1516. The host replication 1512 is connected by a network switch 1518, which has a virtual LAN/SAN 1520, to the array 1500 and the host/hypervisor 1506. The primary host replication 1512 is coupled to a secondary host replication 1522 via a network 1524.

Figure 16:
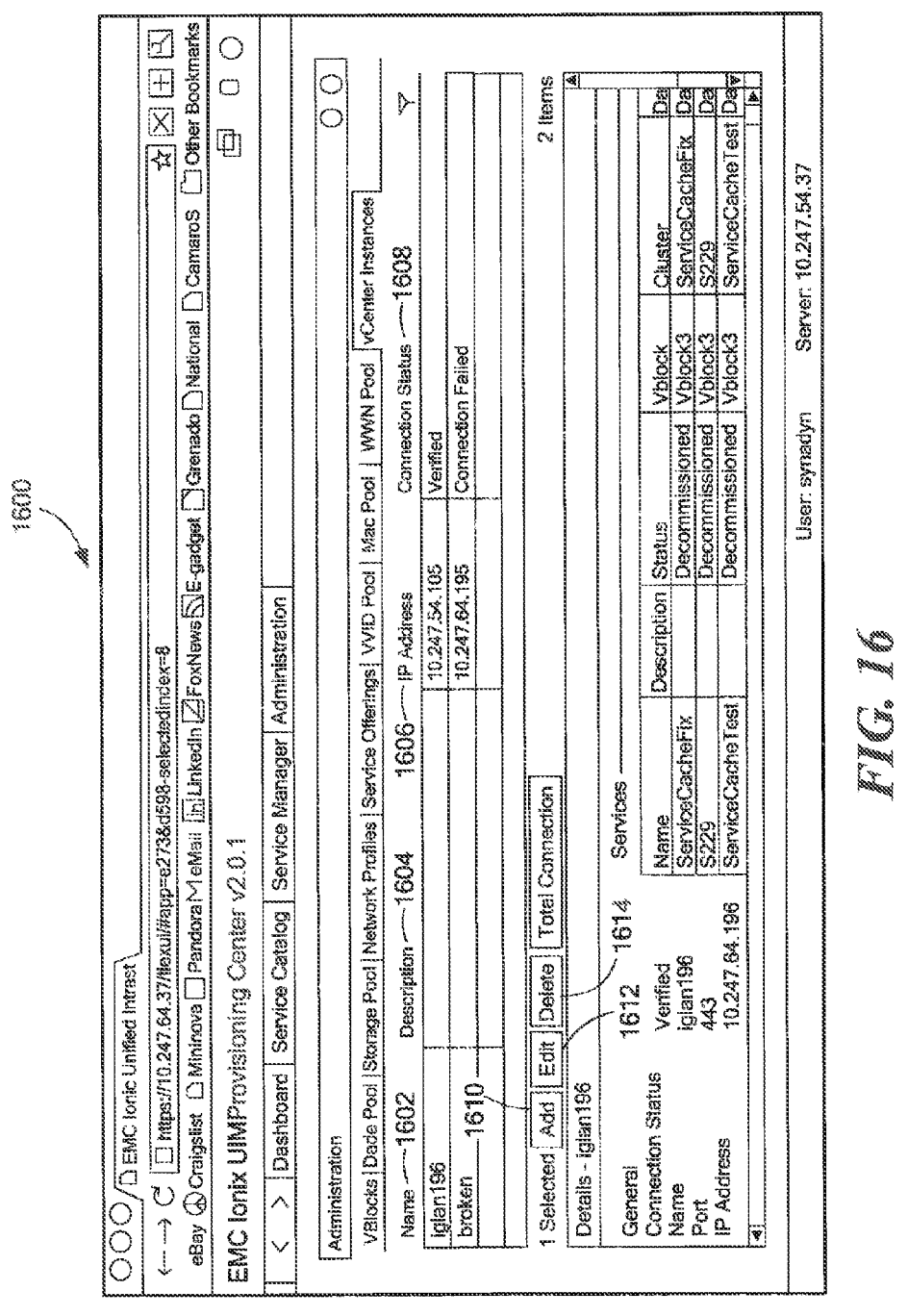

The array 1500 is instructed via mediation to create a volume 1507 and export it to network adaptor 1510. The volume 1502 is created using the service offering's storage and volume profiles. The array adaptor 1504 exports the volume 1502 to the network adaptor 1510 and implements the access control defined in the service network profile. The switch/VLAN 1520 carries NFS over IP traffic from the adaptor 1504 of the array to the adaptor 1516 of the host 1512. The host uses its operating system network file system sub-system to make the array volume visible to the guest of the host. The replication 1512 host appliances and network connectivity supply replication services FIG. 16 shows an exemplary user interface in the form of a display screen 1600 containing the registration information used to identify the hypervisor management interface. This information is used to access the application-programming interface (API) of the hypervisors. The information displayed in this screen provides the management credentials and IP addresses for the management API. The user interface screen has a name 1602, description 1604, IP address 1606, and connection status 1608 with buttons to add 1610, modify 1612, and remove 1614 hypervisor, array, and splitter management information.

Table 1 below shows administration information needed for the replication services. This information provides the replication system(s) information. Replication splitter and array information is discovered using this management information.

| Field/Type | Usage |
| --- | --- |
| In Use/Boolean | In use indicates the replication is using the replication network. All other details are discovered by relationship of replication to array splitter to array to POD |
| Name/String | Symbolic name for this network of replication |
| SN #/String | Serial number of the replication system |
| Volumes | Number of physical volumes under management and being actively replicated |
| LUNs | Number of logical volumes as seen by the DR service |
| POD (Vblock)/String | Logical names of PODs connected in this replication network |
| Type | Type of POD |
| Splitter | Type of Splitter hosted on the array |
| Status | Last known status of POD infrastructure as being operational or failed |

Figure 17:
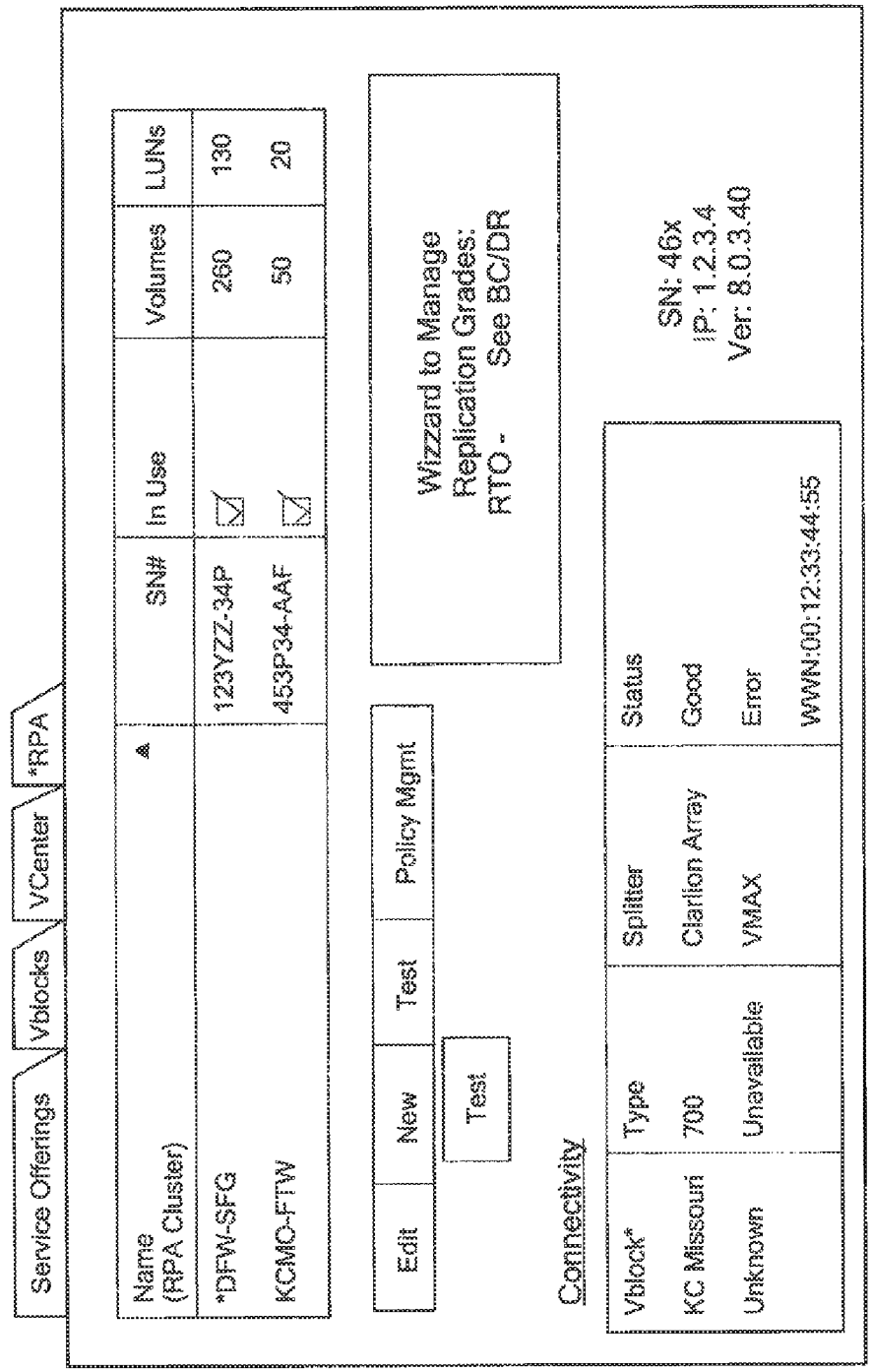
FIG. 17 is an exemplary user interface in the form of a display screen showing administration information for replication services.
Figure 21A:
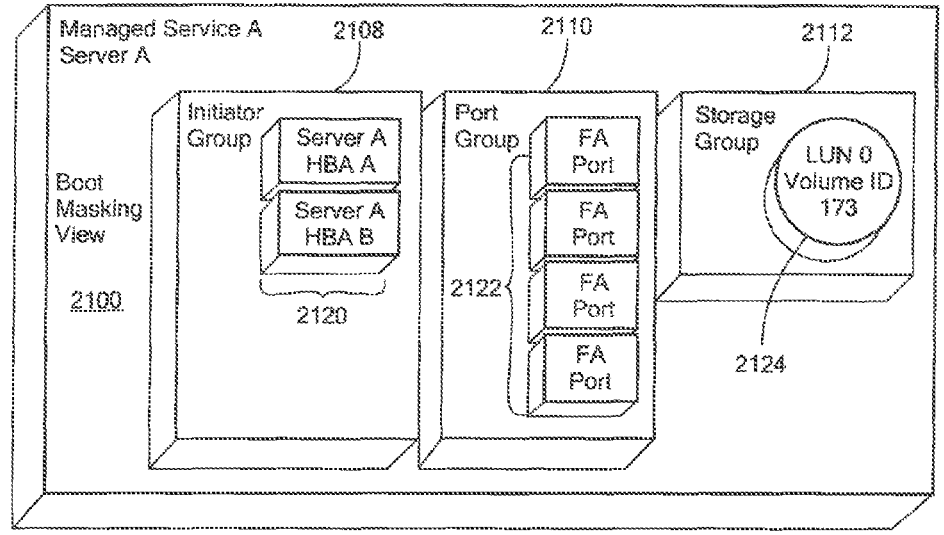
FIGS. 21A-D are representations of an array configuration of POD(s) after masking and mapping the replication system (RPA) to the array.
Figure 21B:
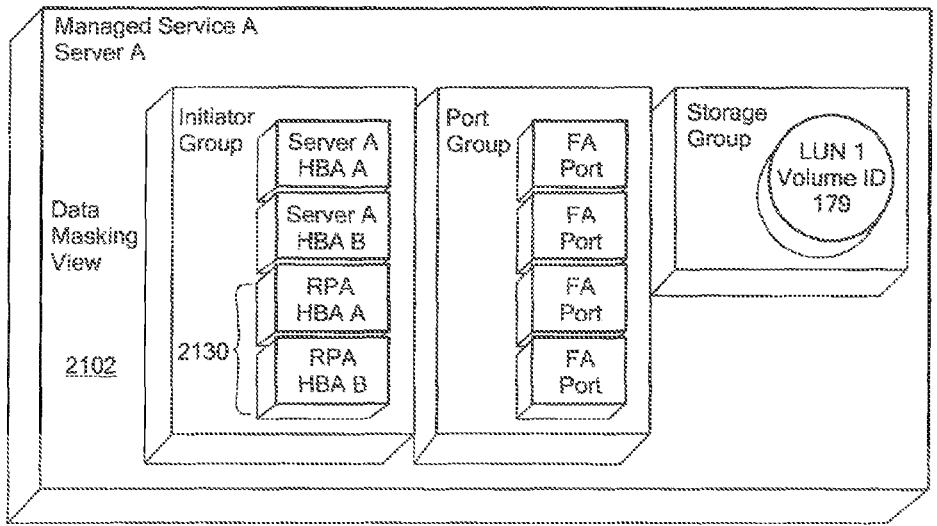
Figure 21C:
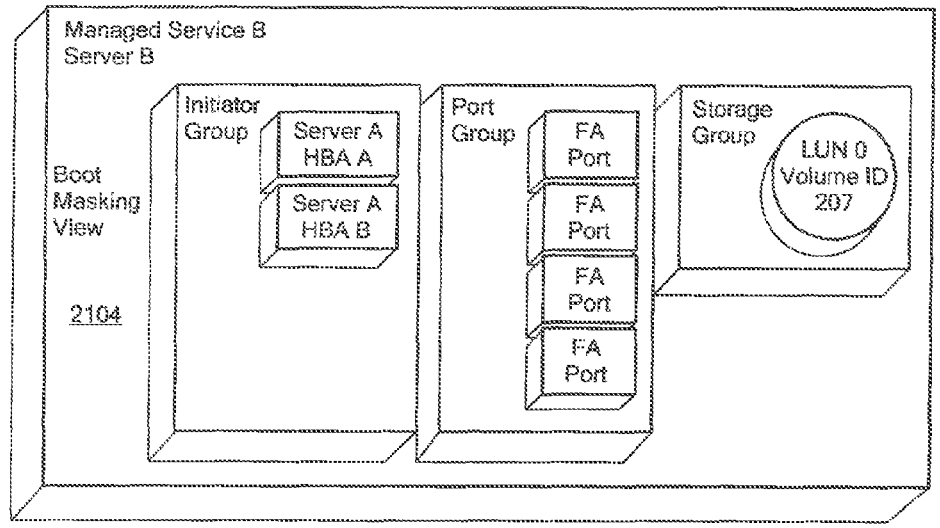
Figure 21D:
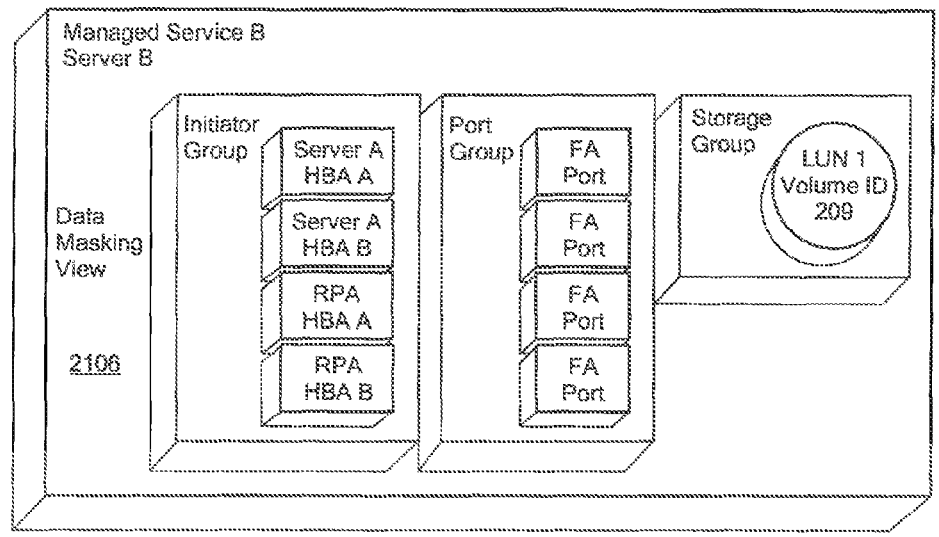

FIG. 17 shows an exemplary display screen showing the administration information needed for the replication services listed in Table 1. This information provides the replication system(s) information. The display can include updating policy and information on the connectivity to other DR clusters. This is useful for debugging connectivity based on the information the system will hold after reading some of the information below.

Table 2 below represents the DR policy settings for an exemplary infrastructure service offering. These DR settings will store policies for the replication settings applied when provisioning the DR storage volumes. This information is entered as policy into the algorithm.

TABLE 2

| Field/Type | Usage |
| --- | --- |
| Grade/String | A symbolic name assigned to the policy used to indicate the policy by name in an infrastructure service storage settings |
| RPO/Time | Recover Point Objective - the goal for the maximum amount of data that will ever be lost due to a disaster or other data-destroying event. Zero is best. |
| RTO/Time | Recover Time Objective - the goal for the maximum time that a recovery operation should ever take. Generally this is in the range of minutes to hours. Zero or instant is best. |

TABLE 2-continued

| Field/Type | Usage |
| --- | --- |
| Snapshot policy/Time Frequency | Identifies how often to take backups of volumes for local recovery |
| Granularity/String | Identifies the rate at which the replication network transmits volume operations for replication |

FIG. 18 shows an exemplary display screen populated with DR settings from Table 2. For example, a Gold level service has an RPO time of 48 hours, a RTO time of 30 minutes and a snapshot policy of daily. Granularity is continuous.

Table 3 contains information discovered using the replication system management API. This table represents the ability to connect volumes from one POD to another using the replication network.

TABLE 3

| Field/Type | Usage |
| --- | --- |
| Primary POD (Vblock)/String | Label or logical name for primary cloud infrastructure and location |
| Secondary POD (Vblock)/String | Label or logical name for secondary cloud infrastructure and location |
| Grade/String | Symbolic name for the grade of replication provided between these PODs |
| Total Capacity/Integer | Storage capacity available for replication between volumes at these POD |
| Free Capacity/Integer | Storage capacity unused by active volumes which is available for replication of new volumes between PODs |

FIG. 19 shows an exemplary display screen having information from Table 3.

FIG. 20 is an exemplary display screen representing a mechanism to add or modify any DR pool. To add or modify a DR Pool 2000, the user selects one or more array pools from a primary 2002 and secondary site 2004. The selection of secondary pools should change based on the primary location chosen first (Primary Vblock Pool). For example, the user can choose Kansas City as Primary Vblock Pool and get a set of array pools on primary from Kansas City. The Secondary Vblock information is updated to reflect those Vblocks connected via replication to the Kansas City Vblock, such as Fort Worth (Secondary Vblock Pool). Then the user can choose Fort Worth's Array Pools. This effectively ties these sets of pools together for use as a logical DR Pool with Grade "Gold". Table 4 below shows the data representation for FIG. 20.

| Field/Type | Usage |
| --- | --- |
| Name/String | Symbolic name for the DR Pool |
| Primary Pool/String | Name of array and native storage pool |
| Secondary Pool/String | Name of array and native storage pool |
| Primary Sight/String | Location name of POD infrastructure |
| Secondary Sight/String | Location name of POD infrastructure |

FIGS. 21A-D are representations of the array configuration of the POD(s) after masking and mapping the replication system (RPA) to the array. In the illustrated representation, managed service A has a boot masking view 2100 and a data masking view 2102 and managed service B has a boot making view 2104 and a data masking view 2106. Each view has an initiator group 2108, a port group 2110, and a storage group 2112.

The initiator group includes servers 2120, the port group 2110 includes a series of ports 2122, and the storage group 2112 includes a volume 2124. The data masking view 2102, in addition to the servers, ports and volumes, includes journaling appliances 2130 with HBAs.

Figure 22:
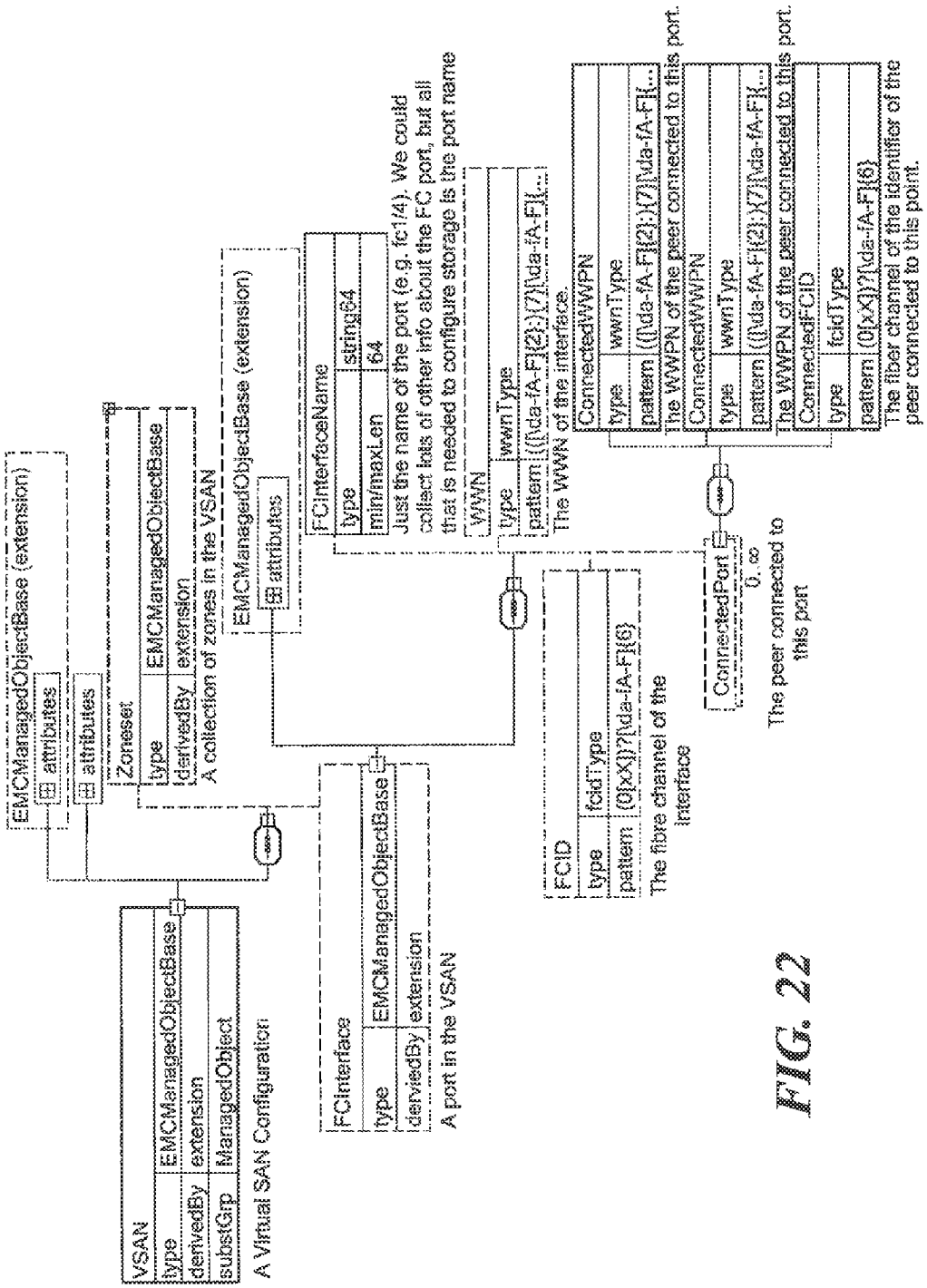
FIG. 22 is a representation of model information discovered from the array, replication and switch management interface describing the connectivity between the replication services, array, and storage network.

FIG. 22 is a representation of model information discovered from the array, replication and switch management interface describing the connectivity between the replication services, array, and storage network. In this model, the VSAN describes a set of zones and network interfaces describing the connected relationships between host or replication network adaptors (WWN or Ethernet address) and the peer array network adaptors.

Table 5 below identifies the zones in the SAN containing connectivity to a storage array and replication network.

| Field | Usage |
| --- | --- |
| Adaptor | Address of adaptor connected to this zone |
| ZoneMember | Logical name for this zone member |
| Zone | Logical name for this zone |
| Zoneset | Logical name for the set of zones active in this zone |
| SAN | Identifier for the network containing this zone |
| SAN Device | Identifier for the SAN switch in this zone |
| Array | Identifier for the array device in this zone |
| Replication host | Identifier for the replication netowrk host in this zone |

Figure 23:
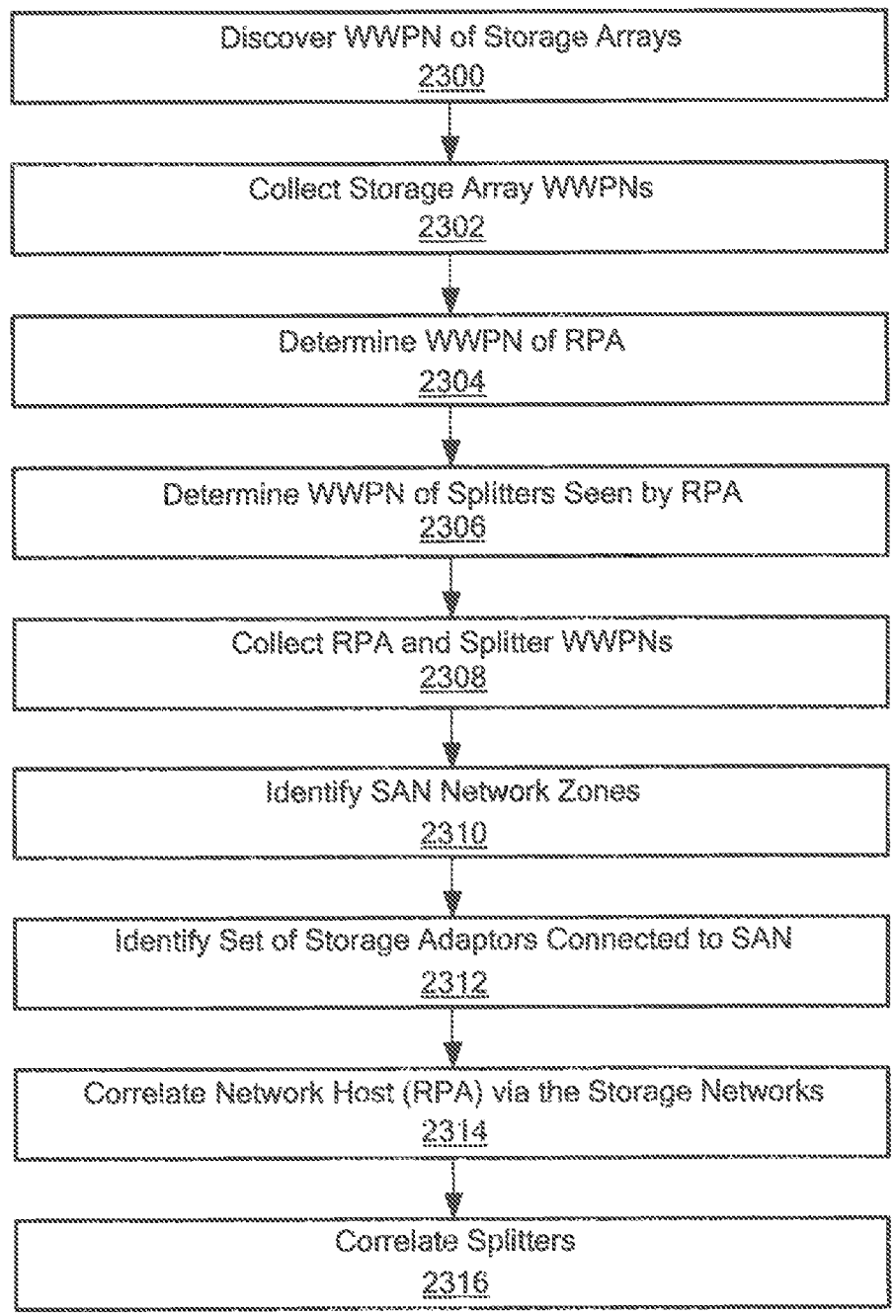
FIG. 23 shows an exemplary set of steps for discovering and correlating network components.

FIG. 23 shows an exemplary set of steps for discovering and correlating network components. In step 2300, storage array WWPNs are discovered. In step 2302, the storage array WWPNs are collected. In step 2304, RPA WWPNs are determined and in step 2306, WWPNs of splitters seen by the RPAs are determined. In step 2308, the RPA and splitter WWPNs are collected. In step 2310, networks zones in the SAN are identified and in step 2312, sets of storage adapters connected to the SAN are identified. In step 2314, the network host (RPA) is correlated via the storage networks. In step 2316, the splitters are correlated. Processing is described in further detail below.

To perform correlation, WWPNs of storage arrays must be discovered (step 2300 FIG. 23). This is performed by reading the management interface of each array. Exemplary pseudo code below organizes the data into a list, type StorageArray-WWPN, containing each storage array and all of the WWPNs of the storage array ports.

```
class StorageArrayWWPN {
  List<WWPN> wwpns
  EMC_UIMStorageArray storageArray
}
// Determine the WWPNs of a storage array
StorageArrayWWPNs(
  EMC_UIMStorageArray storageArray)
{
  List<WWPN> WWPNList
  foreach storageAdapter (EMC_UIMStorageAdapter contained in storageArray) {
    foreach storagePort (EMC_UIMStoragePort contained in
```

```
            storageAdapter) {
                WWPNList.add(storagePort.WWPN)
            }
        }
        return WWPNList
    }
    // Collect the WWPNs of all storage arrays
    StorageArrays( )
    {
        List<StorageArrayWWPN> storageArrayList
            foreach storageArray (EMC_UIMStorageArray discovered in UIM) {
            StorageArrayWWPN sa
                sa.storageArray = storageArray
                sa.wwpns = StorageArrayWWPNs(storageArray)
        }
        return storageArrayList
    }
```

Step 2304 of FIG. 23 refers to replication system discovery. In addition to discovery of the replication system, additional configuration information from each replication system host is needed to perform the correlation. From each replication host the network adaptors are discovered, as well as the splitter configuration. The splitter configuration contains the adaptor ports of the storage array where the splitter is running. The replication host adaptors can be used to discover the host connectivity within the network and the splitter configuration will be used while associating replication networks to storage arrays and building DR pools. Exemplary pseudo code for replication discovery is set forth below.

```
            class RPAWWPN {
                List<WWPN> wwpns
                List<WWPN> splitters
                RPA rpa
            }
            // Determine the WWPNs of a RPA
            RPAWWPNs(
                RPA rpa)
            {
                List<WWPN> WWPNList
                // Find the WWPNs of the RPA
                foreach wwpn (WWPN contained in rpa) {
                    WWPNList.add(wwpn)
                }
                return WWPNList
            }
            // Determine the WWPNs of the splitters seen by the RPA
            RPASplitterPaths(
                RPA rpa)
            {
                List<WWPN> splitterPathList
                    foreach splitter (Splitter contained in rpa) {
                    foreach splitterPath (SplitterPath contained in splitter) {
                        if (splitterPathList.contains(splitterPath.WWPN)) {
                            continue // Already have a path to this WWPN
                        }
                        splitterPathList.add(splitterPath.WWPN)
                    }
                }
                return splitterPathList
            }
            // Collect the WWPNs and splitter WWPNs of all RPAs
            RPAs( )
            {
                List<RPAWWPN> rpaList
                    foreach rpa (RPA discovered in UIM) {
                    RPAWWPN rp
                        rp.rpa = rpa
                        rp.wwpns = RPAWWPNs(rpa)
                        rp.splitters = RPASplitterPaths(rpa)
                }
                return rpaList
            }
```

The recover point appliance ("RPA") class contains a list of splitters, and each splitter contains a list of paths, and each path contains a list of network adaptor addresses. These adaptor addresses are the addresses of the storage adaptor ports on the storage arrays running the splitter.

For correlating splitters and replication networks, given that the adaptor addresses are known for the array and replication network, the endpoints in the SAN for each device, have been identified, correlation of the storage arrays to the replication networks via the SAN topology can be performed.

This is accomplished in three steps:
1. Discover the storage arrays WWPNs within the SAN (steps 2300, 2302)
2. Discover the RPAs WWPNs within the SAN. (step 2304)
3. Identify network zones in the SAN containing connectivity to a storage array and a RPA. This is done by using information in the network connectivity table (step 2310)

Step 2312 of FIG. 23 identifies the set of storage adaptors that are connected to the SAN. The first step is to collect all of the storage adaptor identifiers (WWPNs) that are logged into the SAN. This is maintained and discovered from the SAN switch management interface API. FIG. [WHAT FIG?] models the connectivity table entries as ConnectedPort objects. The ConnectedPort class contains the WWPN (adaptor address) of the device logged into the SAN array adaptor port (e.g. the WWPN of the device physically connected to the SAN switch port). A list, loggedIn List, is created from this data. The system establishes the physical connectivity of the storage host or array to the SAN switches. Exemplary pseudo code is set forth below.

```
    // Determine the storage arrays logged in and zoned in the SAN
    SystemsInSan(
        List<SystemAdaptor> systemList
        StorageSwitch mds)
    {
        class WWPNToVSAN {
            WWPN wwpn
            VSAN vsan
        }
        List<WWPNToVSAN> loggedInList
        List<WWPNZoning> zonedList
        List<WWPNZoning> zonedAndloggedInList
        // Find all of the logged and zoned Storage Array WWPNs
        foreach v (VSAN contained in the mds) {
            // Step 1: Determine the adaptor addresses logged into the SAN
            foreach fcIntf (FCInterface contained in v) {
                foreach connPort (ConnmtedPort contained in fcIntf) {
                    foreach system (SystemWWPN contained in systemList) {
                        if (system.wwpns.contains(connPort.WWPN) {
                            loggedInList.add(connPort.WWPN, v)
                        }
                    }
                }
            }
            // Step 2: Determine the storage array WWPN zoning
            foreach zs (Zoneset contained in v) {
                foreach z (Zone contained in zs) {
                    foreach zm (ZoneMember contained in z) {
                        foreach system (StorageArrayWWPN contained in
                            systemList) {
                            if (system.wwpns.contains(zm.WWPN) {
                                zonedList.add(zm.WWPN, zm, z, zs, v, mds,
        storageArray.storageArray)
                            }
                        }
                    }
                }
            }
            // Step 3: Only return storage adaptors that are zoned and logged in
            foreach zoned (WWPNZoning contained in zonedList) {
                bool found = false
```

```
        foreach loggedIn (WWPNToVSAN contained in loggedInList) {
            if (loggedIn.wwpn == zoned.wwpn) {
                if (loggedIn.vsan.Id != zoned.vsan.Id) {
                    print " Found adaptor logged into to VSAN " +
                        loggedIn.vsan.Id + " but zoned in VSAN " + zoned.vsan.Id
                    continue
                }
                // Found a zoned and logged in storage array WWPN in the
                same VSAN!
                found = true
                zonedAndloggedInList.add(zoned)
            }
        }
        if (!found) {
            print "Found adaptor zoned in VSAN " + zoned.vsan.Id +
                " but the adaptor is not logged into the VSAN"
        }
    }
    return zonedAndloggedInList
}
```

Step 2314 of FIG. 23 correlates replication networks host (RPA) via the storage networks. Creating an intersection of the data collected correlates this information. Processing

```
            // Determine the storage arrays and RPAs zoned together
            foreach storageArrayZone (WWPNZoning contained in
            storageArrayZoneList) {
                foreach rpaZone (WWPNZoning contained in rpaZonList)
                    // See if the WWPNs of the storage array and RPA are
                    in the same
                    // zone, zoneset, vsan, and mds
                    if (storageArrayZone.vsan.Id == rpaZone.vsan.Id &&
                        storageArrayZone.set == rpaZone.zoneset &&
                        storageArrayZone.zone == rpaZone.zone) {
                        WWPNZoning z = storageArrayZone
                        z.rpa = rpaZone.rpa
                        zonedList.add(z)
                    }
                }
            }
        }
        return zonedList
    }
```

Step 2316 of FIG. 23 correlates the splitters including host splitter correlations. This ensures the replication network host (RPA) is properly configured and can utilize the storage array splitters. Exemplary pseudo code is set forth below.

```
class RPASplitter {
    StorageArray storageArray
    RPA rpa
}
// Determine the storage arrays of the splitters seen by the RPA
RPAToStorageArrays( )
{
    List<StorageArrayWWPN> storageArrayList = StorageArrays( )
    List<RPAWWPN> rpaList = RPAs( )
    List<RPASplitter> splitterList
        foreach rpa (RPAWWPN contained in rpaList) {
            foreach splitter (WWPN contained in rpa.splitters) {
                foreach storageArray (StorageArrayWWPN contained in storageArrayList) {
                    if (splitterList.contains(storageArray.storageArray) {
                        continue // Already found a path to this storage array
                    }
                    if (!storageArray.wwpns.contains(splitter) {
                        continue // The WWPN in the splitter it not on t is storage array
                    }
                    // Found the storage array running the splitter
                    splitterList.add(storageArray.storageArray, rps.rpa)
                }
            }
        }
        return splitterList
}
``` calls the previous processing and then inspects the collected data to find zones that contain both storage array WWPNs and RPA WWPNs. This identifies zones on the SAN that have both physical and logical connectivity to a storage array and the RPA. The data collection and correlation is repeated for each SAN switch. Exemplary pseudo code is set forth below.

```
// Determine storage arrays and RPAs zoned together
RPAStorageArrayZoning( )
{
    List<StorageArrayWWPN> storageArrayList = StorageArrays( )
    List<RPAWWPN> rpaList = RPAs( )
    List<WWPNZoning> zonedList
    // Determine the storage arrays and RPAs zoned in each MDS
    foreach mds (SANDevice) {
        List<WWPNZoning> storageArrayZoneList
        List<WWPNZoning> rpaZoneList
        // Get zoning ink for the storage arrays and RPAs
        storageArrayZoneList.add (SystemsInSan(storageArrayList, mds))
        rpaZoneList.add(SystemsInSan(rpaList, mds))
```

Processing utilizes information models before provisioning of the configuration changes on the storage array and replication networks. Processing is performed once for each new POD infrastructure put under system management.

1. Processing provides the configuration changes needed to provision replication at two PODs at both the hypervisor and splitter layers, including control of the replication (enable, disable, tie a specific replication nodes to a volume) as represented by FIGS. 14 and 15.
2. The system allows a cloud user to choose to enable DR on a specific data store or set of data stores (FIG. 10) via association to DR Pools (FIG. 20)

User Input Assertions

1. User choses primary and secondary PODs when configuring DR pools. FIG. 20 shows how a DR pool is created; user provides a name for the pool and the discovered PODS are displayed along with their non-DR pools.
2. User is able to manage the set of primary and secondary array pools used in DR. (FIG. 20)

Figure 24:
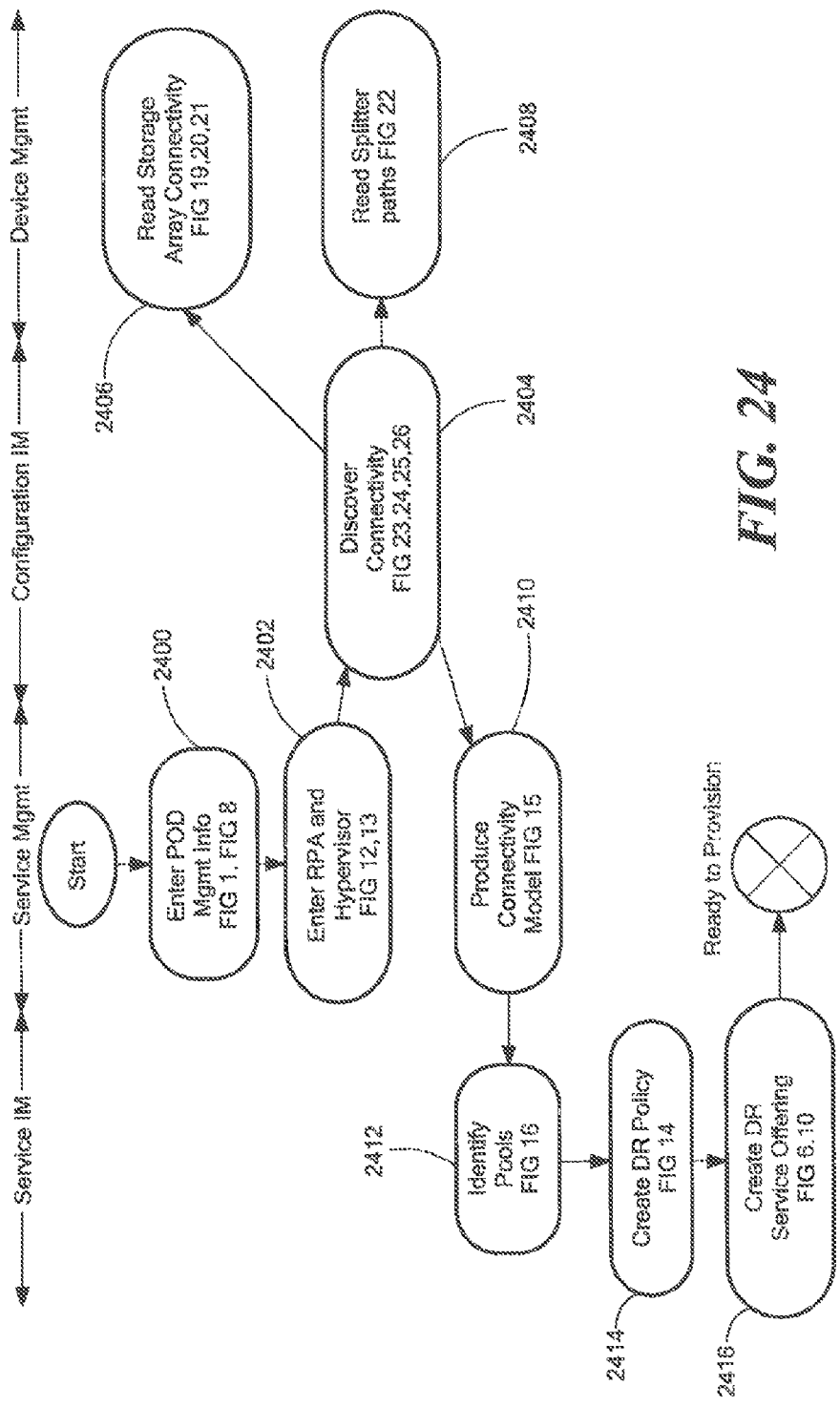
FIG. 24 shows an exemplary sequence of steps to achieve a DR service offering that is ready to provision.

FIG. 24 shows an exemplary sequence of steps to achieve a DR service offering that is ready to provision. In step 2400, a pod comes under management. In step 2402, a user can enter RPA and hypervisor information, as shown in FIG. 16. In step 2404, discovery is performed to obtain connectivity information, as set forth in FIG. 23 and the pseudo code above. In step 2406, storage array connectivity is read and in step 2408, splitter paths are read, as described above.

In step 2410, a connectivity model is produced, such as the model of FIG. 19. In step 2412, pools are identified, as shown in FIG. 20. In step 2414, a DR policy is created, such as that shown in FIG. 18. In step 2416, a DR service offering is created, such as shown in FIGS. 8, 8A, 11A. The service offering is then ready for provisioning.

Figure 25:
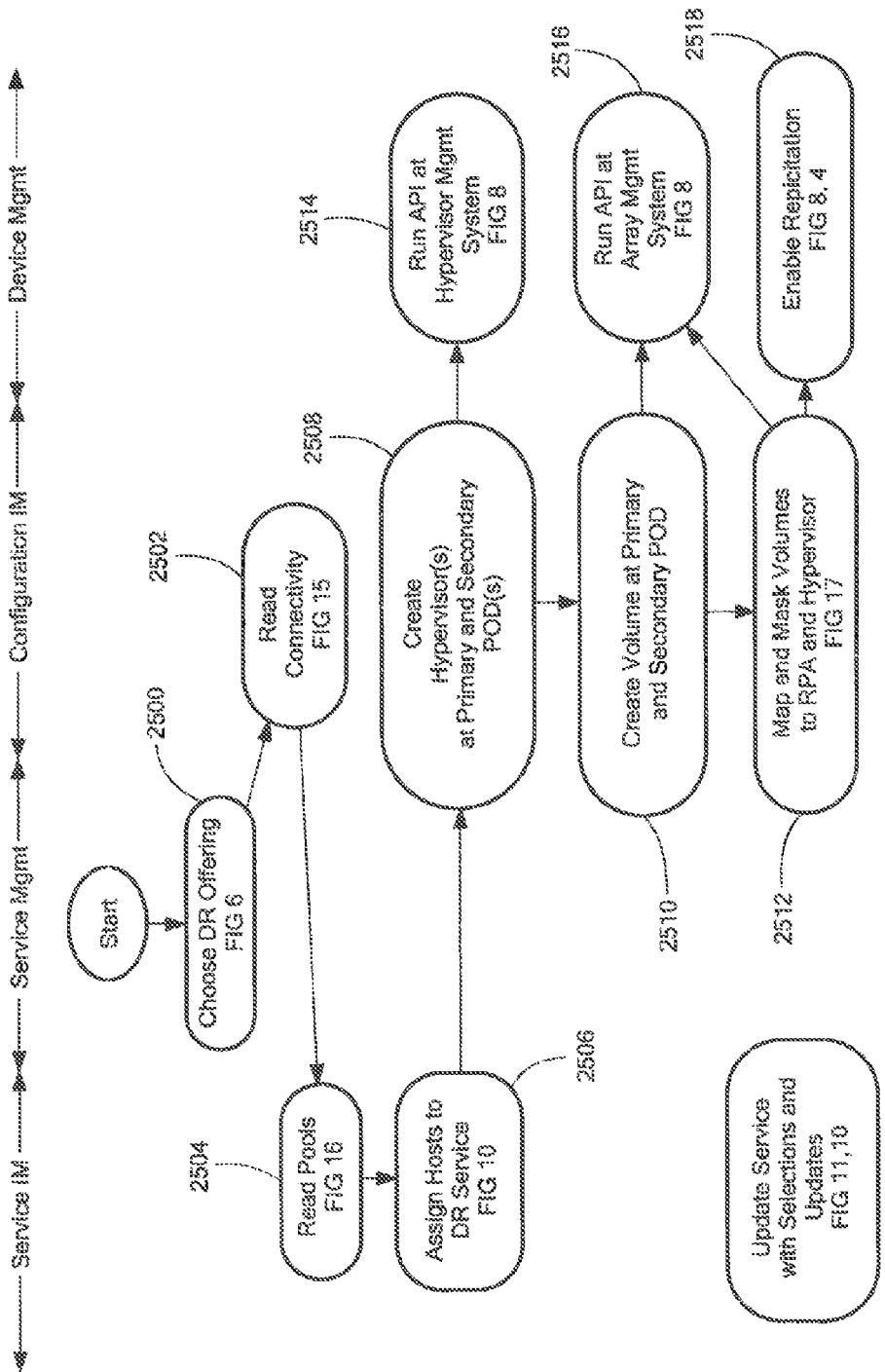
FIG. 25 shows an exemplary sequence of steps for automated provisioning.

After the above discovery and processing, exemplary embodiments of the invention provide automated provisioning of compute systems in DR cluster configurations. To manage these configurations, the system performs a series of processing steps. The system discovers physical and logical topology for the SAN and replication network connectivity, as shown in FIGS. 23, 24 and 25 and accompanying pseudo code, to determine connectivity and relationships between storage arrays, splitters, and replication. This allows the system to: understand logical connectivity between replication and storage systems, understand the replication connectivity between PODs, and supply storage selection criteria for service catalogs.

The system creates predefined services using offerings described above. The system can provision primary and secondary POD resources, such as volumes and hypervisors, provision NAS volume exports to hypervisors and hosts on the hypervisor, and provision replication services between volumes being replicated. The system can provide two volumes that are geographically separated as one logical DR enabled volume, and provide DR services using a DR enabled volume.

FIG. 25 shows an exemplary sequence of steps for automated provisioning in accordance with exemplary embodiments of the invention. In step 2500, a user selects a DR offering, such as the offerings shown in FIG. 11A. In step 2502, the system reads the connectivity of the system, as shown in FIG. 19, and reads the DR pools in step 2504, such as FIG. 20. In step 2506, hosts are assigned to the DR service, see, e.g., FIG. 8.

In step 2508, hypervisor(s) are created at primary and secondary POD(s) and in step 2510, volumes are created at the primary and secondary POD. In step 2512, the system maps and masks volumes to RPA(s) and hypervisor(s), see, e.g., FIG. 13. After creating the hypervisors at step 2508, an API can be run at the hypervisor management system in step 2514. After creating volumes in step 2510, and map/mask in step 2512, an API can be run at the array management system in step 2516. After map/mask in step 2512, in step 2518, replication is enabled, see, e.g., FIGS. 6, 14.

Figure 25A:
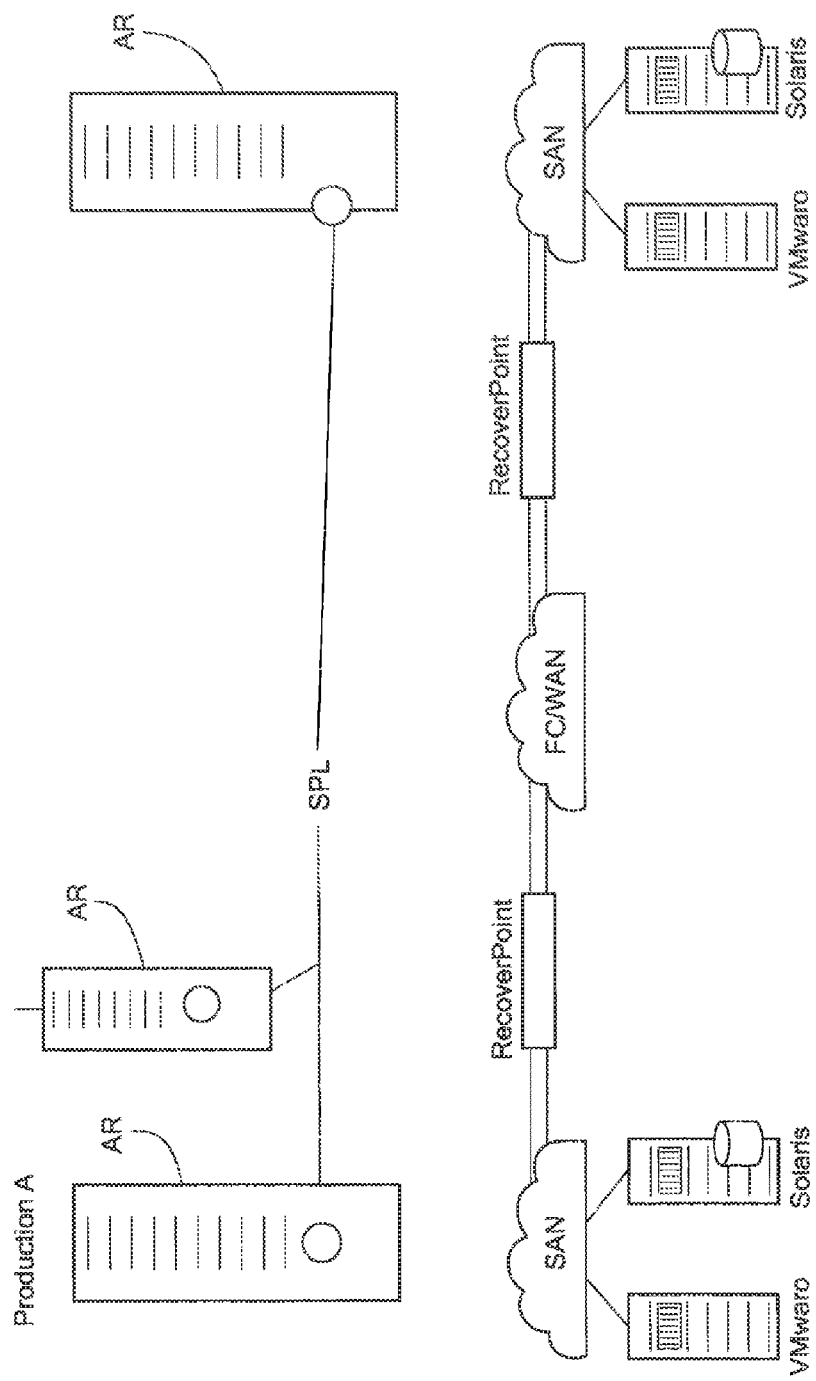
FIG. 25A shows a system having splitters in the array.
Figure 25B:
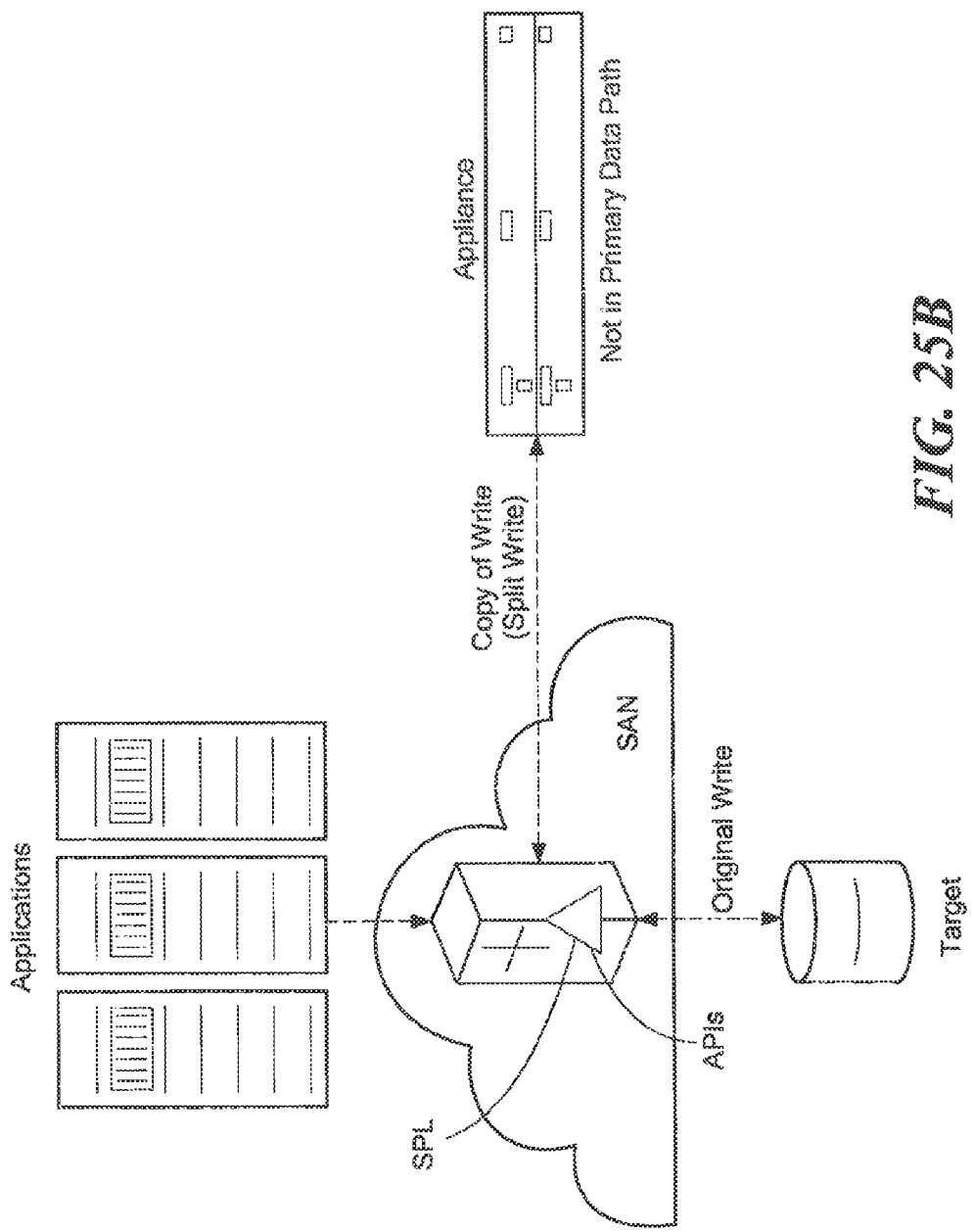
FIG. 25B shows a system having splitters in the SAN.

It is understood that a splitter can be located in variety of locations to meet the needs of a particular location. In one embodiment, a splitter SPL can be located in the arrays AR, as shown in FIG. 25A. In another embodiment, a splitter SPL can be located in the SAN, as shown in FIG. 25B. Splitters can reside on the array and/or in the SAN (fabric-based splitter). The journaling appliance, such as Recoverpoint by EMC Corporation, works to replicate this split traffic. The appliance can work in pairs or in clusters to keep locations replicated.

Figure 26:
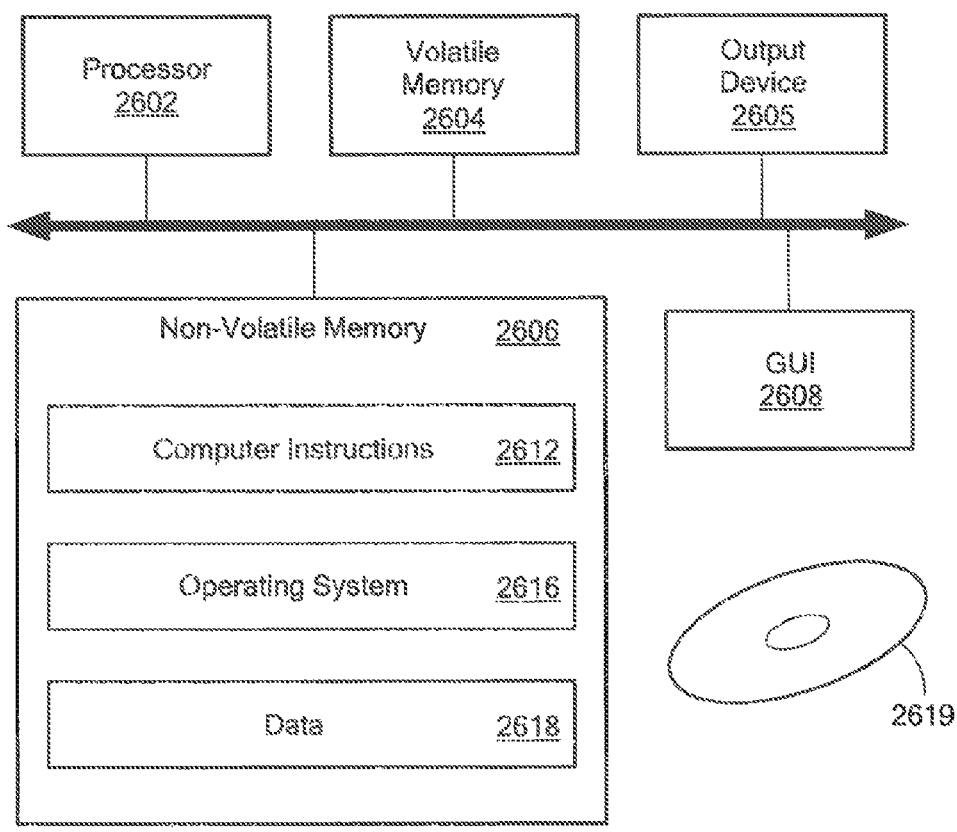
FIG. 26 shows an exemplary computer that can perform at least a portion of the processing described herein.

Referring to FIG. 26, a computer includes a processor 2602, a volatile memory 2604, an output device 2605, a non-volatile memory 2606 (e.g., hard disk), and a graphical user interface (GUI) 2608 (e.g., a mouse, a keyboard, a display, for example). The non-volatile memory 2606 stores computer instructions 2612, an operating system 2616 and data 2618, for example. In one example, the computer instructions 2612 are executed by the processor 2602 out of volatile memory 2604 to perform all or part of the processing described above. An article 2619 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a complied or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   discovering, using a processor, WWPNs for storage arrays in a system by reading an interface of the storage arrays;
   discovering WWPNs of ports of the discovered storage arrays;
   discovering WWPNs of journaling appliances;
   discovering WWPNs of splitters seen by the journaling appliances;
   discovering paths for the splitters;
   discovering network adaptor addresses for the paths;
   identifying networks zones in SANs having connectivity with at least one of the storage arrays and at least one of the journaling appliances;
   determining ones of the storage arrays logged in and zoned in the SANs;
   determining WWPNs of the storage arrays logged in and zoned in the SANs;
   determining WWPN zoning of the storage arrays;
   identify adaptors for storage arrays zoned and logged in;

determining ones of the storage arrays and ones of the journaling appliances zoned together for correlating replication networks host;
determining ones of the storage arrays seen the journaling appliances for correlating ones of the splitters;
identifying disaster recovery pools;
creating a disaster recovery policy;
creating disaster recovery service offerings, the service offerings including geographically separated primary and secondary storage;
receiving a user selection of a disaster recovering service offering;
assigning hosts to the selected service offering;
creating a hypervisor at primary and secondary infrastructure for the selected service offering;
creating a volume at the primary and secondary infrastructure for the selected service offering;
mapping and masking volumes to the journaling appliance and the hypervisor for the selected service offering; and
enabling replication in accordance with the selected service offering.

2. The method according to claim 1, further including applying disaster recovery policy settings to the service.

3. The method according to claim 1, further including determining an ability to connect volumes from a first pod to a second pod.

4. The method according to claim 1, further including discovering configuration information for the splitters including adaptor ports of a storage array on which a first one of the splitters is running.

5. The method according to claim 4, further including using the splitter configuration information to associate replication networks to the storage arrays and to build disaster recovery pools.

6. The method according to claim 1, further including determining a list of paths for the splitters and a list of network adapter addresses for the paths.

7. The method according to claim 1, further including correlating the storage arrays to replication networks via a storage area network.

8. The method according to claim 1, further including correlating the journaling appliances via the storage area networks.

9. The method according to claim 1, further including deleting the selected service.

10. An article, comprising
a computer readable medium containing stored non-transitory instructions that enable a machine to perform:
discovering WWPNs for storage arrays in a system by reading an interface of the storage arrays;
discovering WWPNs of ports of the discovered storage arrays;
discovering WWPNs of journaling appliances;
discovering WWPNs of splitters seen by the journaling appliances;
discovering paths for the splitters;
discovering network adaptor addresses for the paths;
identifying networks zones in SANs having connectivity with at least one of the storage arrays and at least one of the journaling appliances;
determining ones of the storage arrays logged in and zoned in the SANs;
determining WWPNs of the storage arrays logged in and zoned in the SANs;
determining WWPN zoning of the storage arrays;
identify adaptors for storage arrays zoned and logged in;
determining ones of the storage arrays and ones of the journaling appliances zoned together for correlating replication networks host;
determining ones of the storage arrays seen the journaling appliances for correlating ones of the splitters;
identifying disaster recovery pools;
creating a disaster recovery policy;
creating disaster recovery service offerings, the service offerings including geographically separated primary and secondary storage;
receiving a user selection of a disaster recovering service offering;
assigning hosts to the selected service offering;
creating a hypervisor at primary and secondary infrastructure for the selected service offering;
creating a volume at the primary and secondary infrastructure for the selected service offering;
mapping and masking volumes to the journaling appliance and the hypervisor for the selected service offering; and
enabling replication in accordance with the selected service offering.

11. The article according to claim 10, further including instructions for applying disaster recovery policy settings to the service.

12. The article according to claim 10, further including instructions for determining an ability to connect volumes from a first pod to a second pod.

13. The article according to claim 1, further including instructions for discovering configuration information for the splitters including adaptor ports of a storage array on which a first one of the splitters is running.

14. The article according to claim 13, further including instructions for using the splitter configuration information to associate replication networks to the storage arrays and to build disaster recovery pools.

15. The article according to claim 13, further including instructions for determining a list of paths for the splitters and a list of network adapter addresses for the paths.

16. The article according to claim 13, further including instructions for correlating the storage arrays to replication networks via a storage area network.

17. The article according to claim 13, further including instructions for correlating the journaling appliances via the storage area networks.

18. A system, comprising:
at least one processor;
memory coupled to the at least one processor, the memory and the at least one processor configured to enable:
discovering WWPNs for storage arrays in a system by reading an interface of the storage arrays;
discovering WWPNs of ports of the discovered storage arrays;
discovering WWPNs of journaling appliances;
discovering WWPNs of splitters seen by the journaling appliances;
discovering paths for the splitters;
discovering network adaptor addresses for the paths;
identifying networks zones in SANs having connectivity with at least one of the storage arrays and at least one of the journaling appliances;
determining ones of the storage arrays logged in and zoned in the SANs;
determining WWPNs of the storage arrays logged in and zoned in the SANs;
determining WWPN zoning of the storage arrays;
identify adaptors for storage arrays zoned and logged in;

determining ones of the storage arrays and ones of the journaling appliances zoned together for correlating replication networks host;

determining ones of the storage arrays seen the journaling appliances for correlating ones of the splitters;

identifying disaster recovery pools;

creating a disaster recovery policy;

creating disaster recovery service offerings, the service offerings including geographically separated primary and secondary storage;

receiving a user selection of a disaster recovering service offering;

assigning hosts to the selected service offering;

creating a hypervisor at primary and secondary infrastructure for the selected service offering;

creating a volume at the primary and secondary infrastructure for the selected service offering;

mapping and masking volumes to the journaling appliance and the hypervisor for the selected service offering; and enabling replication in accordance with the selected service offering.

* * * * *